United States Patent
Marovets

(10) Patent No.: US 11,824,920 B2
(45) Date of Patent: Nov. 21, 2023

(54) SYSTEM, METHOD, AND APPARATUS FOR UPLOADING, LISTENING, VOTING, ORGANIZING, AND DOWNLOADING MUSIC, AND/OR VIDEO, WHICH OPTIONALLY CAN BE INTEGRATED WITH A REAL WORLD AND VIRTUAL WORLD ADVERTISING AND MARKETING SYSTEM THAT INCLUDES COUPON EXCHANGE

(71) Applicant: Jack L. Marovets, Cedar Rapids, IA (US)

(72) Inventor: Jack L. Marovets, Cedar Rapids, IA (US)

( * ) Notice: Subject to any disclaimer, the term of this patent is extended or adjusted under 35 U.S.C. 154(b) by 722 days.

(21) Appl. No.: 14/680,601

(22) Filed: Apr. 7, 2015

(65) Prior Publication Data
US 2015/0215373 A1 Jul. 30, 2015

Related U.S. Application Data

(62) Division of application No. 13/694,316, filed on Nov. 16, 2012, now abandoned.
(Continued)

(51) Int. Cl.
| | | |
|---|---|---|
| *H04L 67/06* | (2022.01) | |
| *H04L 67/02* | (2022.01) | |
| *G06Q 30/0251* | (2023.01) | |
| *G06Q 30/0217* | (2023.01) | |
| *G06F 3/0484* | (2022.01) | |
| *G07C 13/00* | (2006.01) | |
| *G06Q 50/00* | (2012.01) | |

(52) U.S. Cl.
CPC ............. *H04L 67/06* (2013.01); *G06F 3/0484* (2013.01); *G06Q 30/0217* (2013.01); *G06Q 30/0251* (2013.01); *G06Q 30/0263* (2013.01); *G07C 13/00* (2013.01); *H04L 67/02* (2013.01); *G06Q 50/01* (2013.01)

(58) Field of Classification Search
CPC .......... G06Q 30/0227; G06Q 30/0231; G06Q 30/0232; G06Q 30/0217; G07C 13/00; H04L 67/06
See application file for complete search history.

(56) References Cited

U.S. PATENT DOCUMENTS

| | | |
|---|---|---|
| 2002/0198777 A1 | 12/2002 | Yuasa |
| 2007/0044639 A1 | 3/2007 | Farbood et al. |
(Continued)

OTHER PUBLICATIONS

Cha et al, Analyzing the Video Popularity Characteristics of Large-Scale User Generated Content Systems, IEEE/ACM Transactions on Networking, vol. 17, No. 5, Oct. 2009, pp. 1357-1370 (Year: 2009).*

(Continued)

*Primary Examiner* — Andre D Boyce
(74) *Attorney, Agent, or Firm* — Goodhue, Coleman & Owens, P.C.

(57) ABSTRACT

The present invention relates to the use of free delivery to create a new system, method, and apparatus used for uploading, listening, voting, organizing, and downloading of music, and/or video, which optionally may be used in conjunction with a hybrid hard copy/soft copy advertising and marketing that also includes a coupon exchange system. The present invention also includes a novel "flush" vote system for rating music, and/or video.

14 Claims, 1 Drawing Sheet

Related U.S. Application Data

(60) Provisional application No. 61/629,282, filed on Nov. 16, 2011.

(56) References Cited

U.S. PATENT DOCUMENTS

| | | |
|---|---|---|
| 2007/0143182 A1 | 6/2007 | Faber et al. |
| 2008/0010319 A1 | 1/2008 | Vonarburg et al. |
| 2008/0013701 A1* | 1/2008 | Barhydt ............... H04L 51/32 379/92.02 |
| 2008/0120501 A1* | 5/2008 | Jannink ............ G06F 17/30017 713/163 |
| 2009/0287545 A1 | 11/2009 | Albright |
| 2010/0228740 A1* | 9/2010 | Cannistraro ...... G06F 17/30749 707/748 |
| 2011/0040707 A1* | 2/2011 | Theisen ............... G11B 27/105 706/12 |
| 2011/0145045 A1* | 6/2011 | Murphy ................ G06Q 30/02 705/14.16 |
| 2012/0197651 A1* | 8/2012 | Robinson ............... G06Q 30/02 705/1.1 |
| 2013/0080445 A1* | 3/2013 | Gogan ............. G06F 17/30053 707/748 |
| 2013/0191857 A1* | 7/2013 | Guinn .................... H04H 20/38 725/24 |
| 2013/0238444 A1* | 9/2013 | Munaco ............ G06Q 30/0269 705/14.66 |
| 2017/0124092 A1* | 5/2017 | Eyal ................. G06F 17/30053 |

OTHER PUBLICATIONS

Cha et al., I Tube, You Tube, Everybody Tubes: Analyzing the World's Largest User Generated Content Video System, IMC '07: Proceedings of the 7th Acm Sigcomm conference on Internet measurement, Oct. 2007, pp. 1-14 (Year: 2007).*

* cited by examiner

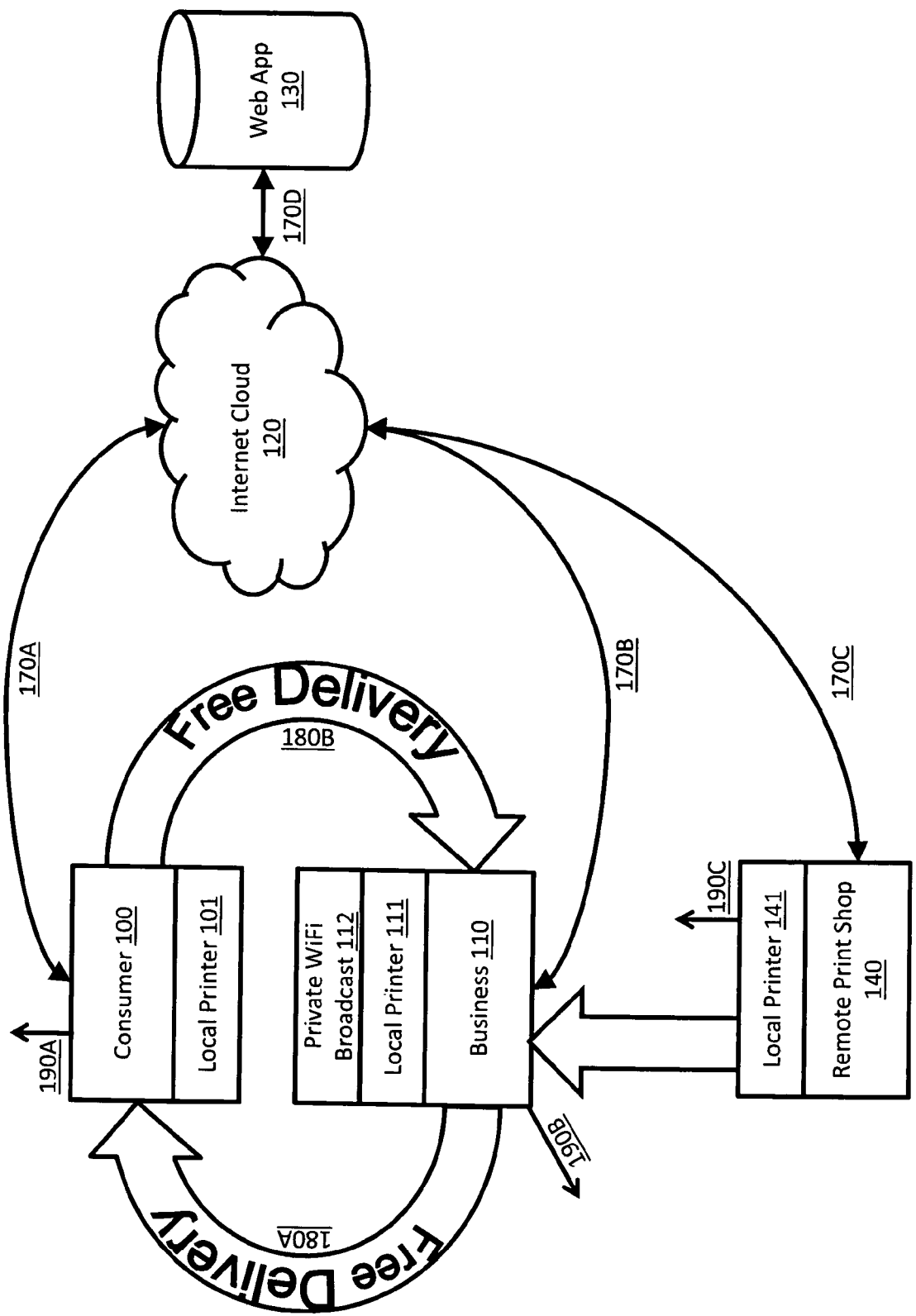

SYSTEM, METHOD, AND APPARATUS FOR UPLOADING, LISTENING, VOTING, ORGANIZING, AND DOWNLOADING MUSIC, AND/OR VIDEO, WHICH OPTIONALLY CAN BE INTEGRATED WITH A REAL WORLD AND VIRTUAL WORLD ADVERTISING AND MARKETING SYSTEM THAT INCLUDES COUPON EXCHANGE

CROSS-REFERENCE TO RELATED APPLICATIONS

This application is a Divisional Applications of U.S. Ser. No. 13/694,316 filed Nov. 16, 2012, which is a conversion of U.S. Provisional patent application Ser. No. 61/629,282, filed on Nov. 16, 2011, which is hereby incorporated by reference in it's entirety.

This application also claims priority to and is a conversion of U.S. Provisional Patent Application Ser. No. 61/456,166, to Jack Marovets, entitled System, Method, And Apparatus For Integrating Real World And Virtual World Advertising And Marketing; U.S. Provisional Patent Application Ser. No. 61/571,061, to Jack Marovets, entitled Improved System, Method, And Apparatus For Integrating Real World And Virtual World Advertising And Marketing Using Hard Copy And Soft Copy Materials In A Hybrid Manner; and U.S. Provisional Patent Application Ser. No. 61/573,547, to Jack Marovets, entitled System, Method, And Apparatus For Integrating Real World And Virtual World Advertising And Marketing, which are all hereby incorporated by reference in their entirety.

FIELD OF THE INVENTION

The present invention relates to the use of free delivery to create a new system, method, and apparatus used for uploading, listening, voting, organizing, and downloading of music, and/or video, which optionally may be used in conjunction with a hybrid hard copy/soft copy advertising and marketing that also includes a coupon exchange system. The present invention also includes a novel "flush" vote system for rating music, and/or video.

PRIOR ART

There are many systems for uploading, listening, voting, organizing, and downloading music, and/or video, however, there is a need for a system, method, and apparatus for uploading, listening, voting, organizing, and downloading music with a novel rating method, which can optionally be incorporated with a novel hybrid hard copy/soft copy advertising and marketing that also includes a coupon exchange system.

Objects and Features of the Invention

It is an object of the present invention to provide a system, method, and apparatus for a system to enable musicians (artists) to upload their original works, gain recognition, and earn compensation.

It is an object of the present invention to provide a system, method, and apparatus for a system to create a web-based application that would have social network ability that would enable listeners (consumers) and musicians (artists) to come together It is an object of the present invention to provide a system, method, and apparatus for a system to enable musicians (artists) to upload music, and/or video, files.

It is an object of the present invention to provide a system, method, and apparatus that would enable uploaded music, and/or video, to be finely classified, filtered, sorted, and tagged, using a wide variety of genres, including, but not limited to, African Genres, Afrobeat, Apala, Benga, Bongo Flava, Bikutsi, Cape Jazz, Chimurenga, Fuji Music, Genge, Highlife, Hiplife, Isicathamiya, Jit, Jùjú, Kapuka, Aka Boomba, Kizomba, Kuduro, Kwaito, Kwela, Makossa, Maloya, Marrabenta, Mbalax, Museve Aka Sungura, Mbaqanga, Mbube, Morna, Palm-Wine, Rai, Reggae, Sakara, Sega, Semba, Soukous AKA Congo or Lingala or African Rumba, Taarab, Zouglou Cote D'ivoire, Asian Genres, Anison, Baila, Bhangra, Bollywood Music, Dangdut, Enka, Kayōkyoku, Luk Thung, Luk Krung, Manila Sound, Morlam, Onkyokei, K-Pop, J-Pop, C-Pop, Taiko, Avant-Garde Genres, Experimental Music, Noise, Lo-Fi, and Musique Concrete; Blues Genres, such as, but not limited to, Acid Blues, African Blues, Blues Rock, Blues Shouter, British Blues, Canadian Blues, Chicago Blues, Classic Female Blues, Contemporary R&B, Country Blues, Delta Blues, Detroit Blues, Electric Blues, Gospel Blues, Hill Country Blues, Hokum Blues, Jazz Blues, Jump Blues, Kansas City Blues, Louisiana Blues, Memphis Blues, Plano Blues, Piedmont Blues, Punk Blues, Rhythm And Blues, Soul Blues, St. Louis Blues, Swamp Blues, Texas Blues, West Coast Blues, Brazilian Music Genres, Samba, Choro, Frevo, Maraca, Bossa Nova, Tropical, Mpb, Forro, Samba Rock, Brega, Pagode, Funk Carioca, Axé, Rap, Lambada, Zouk-Lambada, Sertanejo, Brazilian Rock, Tecnobrega, Comedy Music Genres, Comedy Music, Comedy Rock, Parody Music, Country Music Genres, Alternative Country Music, Cowpunk, Blues Country, Hellbilly Music, Hokum, Outlaw Country, Progressive Country, Psychobilly, Punkabilly, Zydeco, Rap Country, Red Dirt, Rockabilly, Rock Country, Cosmic American Music, Soul Country, Techno-Country, Texas Country, Americana, Australian Country Music, and Bakersfield Sound, Bluegrass Music, Old-Time Bluegrass, Appalachian Bluegrass, Progressive Bluegrass, and Reactionary Bluegrass, Cajun, Cajun Fiddle Tunes, Christian Country Music, Classic Country, Close Harmony, Cowboy/Western, Dansband Music, Franco-Country, Gulf And Western, Honky Tonk, Instrumental Country, Lubbock Sound, Nashville Sound/Countrypolitan, Neotraditional Country, New Country, Pop Country/Cosmopolitan Country, Sertanejo, Traditional Country Music, Truck-Driving Country, Western Swing, Easy Listening Genres, Background Music, Beautiful Music, Elevator Music, Furniture Music, Lounge Music, Middle Of The Road, Adult Contemporary, New Age Music, Electronic Music Genres, Ambient, Ambient Dub, Ambient House, Ambient Techno, Dark Ambient, Drone Music, Illbient, Isolationism, Lowercase, Asian Underground, Breakbeat, Acid Breaks, Baltimore Club, Big Beat, Breakbeat Hardcore, Hardcore Breaks, Broken Beat, Florida Breaks, Nu Skool Breaks, 4-Beat, Chiptune, Bitpop, Game Boy Music, Nintendocore, Video Game Music, Yorkshire, Bleeps And Bass, Disco, Cosmic Disco, Disco Polo, Europop, Euro Disco, Space Disco, Italo Disco, Nu-Disco, Downtempo, Acid Jazz, Balearic Beat, Chill Out, Dub Music, Dubtronica, Ethnic Electronica, Moombahton, New Age Music, Nu Jazz, Trip Hop, Drum And Bass, Darkcore, Darkstep, Drumfunk, Drumstep, Hardstep, Intelligent Drum And Bass, Jump-Up, Liquid Funk, Neurofunk, Oldschool Jungle, Darkside Jungle, Ragga-Jungle, Raggacore, Sambass, Trancestep, Electro, Crunk, Electro Backbeat, Electro- Grime, Electropop, Electroacoustic, Acousmatic Music, Computer Music, Electroacoustic Improvisation, Field Recording, Live Electronics, Live Coding, Musique Concrete, Soundscape Composition, Tape Music, Electronica, Berlin School, Chillwave, Electronic Art Music, Electronic Dance Music, Folktronica, Freestyle Music, Idm, Glitch, Laptronica, Rave Breaks, Skweee, Sound Art, Synthcore, Electronic Rock, Alternative Dance, Baggy, Madchester, Dance-Punk, Dance-Rock, Dark Wave, Electroclash, Electropunk, Ethereal Wave, Indietronica, New Rave, Space Rock, Synthpop, Synthpunk, Trip Rock, Eurodance, Bubblegum Dance, Eurotrance, J-Pop, Italo Dance, Turbofolk, Hardcore/Hard, Dance, Bouncy House, Bouncy Techno, Breakcore, Darkcore, Digital Hardcore, Doomcore, Gabber, Happy Hardcore, Hardstyle, Jumpstyle, Makina, Speedcore, Terrorcore, Uk Hardcore, Hi-Nrg, Eurobeat, Hard Nrg, New Beat, House, Acid House, Chicago House, Deep House, Diva House, Dutch House, Electro House, French House, Freestyle House, Funky House, Ghetto House, Hardbag, Hip House, Italo House, Latin House, Minimal House/Microhouse, Progressive House, Rave Music, Swing House, Tech House, Tribal House, UK Hard House, US Garage, Vocal House, Industrial, Aggrotech, Coldwave, Cybergrind, Dark Electro, Death Industrial, Electronic Body Music, Futurepop, Electro-Industrial, Industrial Metal, Neue Deutsche Harte, Industrial Rock, Noise, Japanoise, Power Noise, Power Electronics, Witch House/Drag, Post-Disco, Boogie, Dance-Pop, Progressive, Progressive Breaks, Progressive Drum & Bass, Progressive House/Trance, Disco House, Dream House, Space House, Progressive Techno, Techno, Acid Techno, Detroit Techno, Free Tekno, Ghettotech, Minimal, Nortec, Rotterdam Techno, Schranz/Hardtechno, Symphonic Techno, Tecno Brega, Techno-Dnb, Techstep, Toytown Techno, Trance, Acid Trance, Classic Trance, Dream Trance, Euro-Trance, Goa Trance/Psychedelic Trance, Dark Psytrance, Full On, Psyprog, Psybient, Psybreaks, Suomisaundi, Hard Trance, Tech Trance, Uplifting Trance, Orchestral Uplifting, Vocal Trance, UK Garage, 2-Step, 4.times.4, Bassline, Breakstep, Dubstep, Funky, Grime, Speed Garage, Modern Folk, Contemporary Folk, Indie Folk, Neofolk, Progressive Folk, Anti-Folk, Freak Folk, Filk Music, American Folk, Revival, British Folk Revival, Industrial Folk, Techno-Folk, Psychedelic Folk, Hip Hop, Old School Hip Hop, New School Hip Hop, Golden Age Hip Hop, Alternative Hip Hop, Avant-Garde Hip Hop, Chopped And Screwed, Christian Hip Hop, Conscious Hip Hop, Country-Rap, Crunk, Crunkcore, Electro Music, Freestyle Music, Freestyle Rap, G-Funk, Gangsta Rap, Ghetto House, Ghettotech, Grime, Hardcore Hip Hop, Hip Hop Soul, Hip House, Hip Pop, Horrorcore, Hyphy, Industrial Hip Hop, Instrumental Hip Hop, Jazz Rap, Lyrical Hip Hop, Mafioso Rap, Nerdcore Hip Hop, New Jack Swing, Political Hip Hop, Ragga, Reggaeton, Rap Opera, Rap Rock, Rapcore, Rap Metal, Snap Music, Turntablism, Underground Hip Hop, East Coast Hip Hop, Baltimore Club, Brick City Club, Hardcore Hip Hop, Mafioso Rap, New Jersey Hip Hop, Midwest Hip Hop, Chicago Hip Hop, Ghetto House—From Chicago, Ill., Detroit Hip Hop, Ghettotech, St. Louis Hip Hop, Twin Cities Hip Hop, Horrorcore, Southern Hip Hop, Atlanta Hip Hop, Snap Music, Bounce Music, Crunk, Houston Hip Hop, Chopped And Screwed, Miami Bass, West Coast Hip Hop, Chicano Rap, Gangsta Rap, G-Funk, Hyphy, Jerkin', Bongo Flava, Cumbia Rap, Hiplife, Kwaito, Low Bap, Merenrap, Motswako, Reggae Espanol/Spanish Reggae, Reggaeton, Songo-Salsa, Trip Hop (or Bristol Sound), Urban Pasifika, Jazz, Acid Jazz, Asian American Jazz, Avant-Garde Jazz, Bebop, Boogie-Woogie, Bossa Nova, British Dance Band, Cape Jazz, Chamber Jazz, Continental Jazz, Cool Jazz, Crossover Jazz, Cubop, Dixieland, Ethno Jazz, European Free Jazz, Free Funk, Free Improvisation, Free Jazz, Gypsy Jazz, Hard Bop, Jazz Blues, Jazz-Funk, Jazz Fusion, Jazz Rap, Jazz Rock, Kansas City Blues, Kansas City Jazz, Latin Jazz, Livetronica, M-Base, Mainstream Jazz, Modal Jazz, Neo-Bop Jazz, Neo-Swing, Novelty Ragtime, Nu Jazz, Orchestral Jazz, Post-Bop, Punk Jazz, Ragtime, Shibuya-Kei, Ska Jazz, Smooth Jazz, Soul Jazz, Stride Jazz, Straight-Ahead Jazz, Swing, Third Stream, Trad Jazz, Urban Jazz, Vocal Jazz, West Coast Gypsy Jazz, West Coast Jazz, Zeuhl, Latin American, Axe, Bachata, Baithak Gana, Bossa Nova, Calypso, Chutney, Chutney Soca, Cumbia, Funk Carioca, Huayno, Kompa, Mambo, Mariachi, Merengue, Música Popular Brasileira, Ranchera, Reggaeton, Salsa, Samba, Soca, Son, Tejano, Tropicalismo, Zouk, Pop, Arab Pop, Austropop, Balkan Pop, Baroque Pop, Bubblegum Pop, Classical Crossover, Chinese Pop, Country Pop, Dance-Pop, Disco Polo, Electropop, Eurobeat, Europop, French Pop, Hong Kong And Cantonese Pop, Hong Kong English Pop, Indian Pop, Indonesian Pop, Iranian Pop, Italo Dance, Italo Disco, Jangle Pop, Japanese Pop, Korean Pop, Latin Pop, Levenslied, Louisiana Swamp Pop, Mandarin Pop, Mexican Pop, Motorpop, Nederpop, New Romantic, Operatic Pop, Pop Rap, Psychedelic Pop, Russian Pop, Soft Rock, Sophisti-Pop, Space Age Pop, Sunshine Pop, Surf Pop, Synthpop, Taiwanese Pop, Teen Pop, That Pop, Traditional Pop Music, Turkish Pop, Vispop, Wonky Pop, R&B, Contemporary R&B, Doo Wop, Funk, Deep Funk, Disco, Post-Disco, Boogie, Go-Go, P-Funk, New Jack Swing, Soul, Blue-Eyed Soul, Hip Hop Soul, Northern Soul, Neo Soul, Rock, Alternative Rock, Britpop, Post-Britpop, Dream Pop, Grunge, Post-Grunge, Indie Pop, Dunedin Sound, Twee Pop, Indie Rock, Industrial Rock, Noise Pop, Sadcore, Shoegazer, Slowcore, Art Rock, Beat Music, Chinese Rock, Dark Cabaret, Experimental Rock, Electronic Rock, Folk Rock, Garage Rock, Glam Rock, Hard Rock, Heavy Metal, Alternative Metal, Nu Metal, Black Metal, Viking Metal, Christian Metal, Death Metal, Melodic Death Metal, Technical Death Metal, Goregrind, Doom Metal, Drone Metal, Folk Metal, Celtic Metal, Medieval Metal, Funk Metal, Glam Metal, Gothic Metal, Industrial Metal, Metalcore, Deathcore, Mathcore, Djent, Power Metal, Progressive Metal, Sludge Metal, Speed Metal, Stoner Rock, Symphonic Metal, Thrash Metal, Crossover Thrash Metal, Groove Metal, Jazz-Rock, Math Rock, New Wave, World Fusion, Paisley Underground, Desert Rock, Pop Rock, Post-Metal, Post-Rock, Power Pop, Progressive Rock, Canterbury Scene, Krautrock, New Prog, Rock In Opposition, Space Rock, Psychedelic Rock, Acid Rock, Freakbeat, Neo-Psychedelia, Raga Rock, Punk Rock, Anarcho Punk, Crust Punk, D-Beat, Art Punk, Deathrock, Digital Hardcore, Folk Punk, Celtic Punk, Cowpunk, Gypsy Punk, Garage Punk, Grindcore, Crustgrind, Noisegrind, Hardcore Punk, Post-Hardcore, Emo, Screamo, Thrashcore, Crossover Thrash Metal, Powerviolence, Street Punk, Horror Punk, Pop Punk, Post-Punk, Post-Punk Revival, Psychobilly, Riot Grrrl, Ska Punk, Skacore, Skate Punk, Gothic Rock, No Wave, Noise Rock, Rap Rock, Rap Metal, Rapcore, Rock And Roll, Southern Rock, Sufi Rock, Surf Rock, Visual Kei, Nagoya Kei, Ska, 2 Tone, Dancehall, Dub, Lovers Rock, Ragga, Reggae, Polish Reggae, Reggaefusion, Rocksteady, Contemporary Christian, Laiko, Pinoy Pop, Schlager, Sung Poetry, Upscale, and Worldbeat, etc, and to be finely classified, filtered, sorted, and tagged, using a wide variety of video genres, including, but not limited to, Absolute Film, Action Film, Actuality Film, Adventure Film, Amateur Film, Animated Documentary, Anime, Anthology Film, Apocalyptic And Post-Apocalyptic Fiction, Art Film, Arthouse Action Genre, Backstage Musical, Bad Girl Movies, Beach Party Film, Bildungsroman, Biographical Film, Blaxploitation, Blue Film, Body Horror, Bourekas Film, Buddy Cop Film, Buddy Film, Camcorder Film, Cannibal Film, Cartoon, Chanchada, Chick Flick, Children's Film, Chopsocky, Christian Film Industry, Film Novo, Colonial Film, Comedy Film, Comedy Horror, Comedy Of Remarriage, Comedy-Drama, Comic Fantasy, Comic Science Fiction, Coming-Of-Age Film, Compilation Film, Composite Film, Conspiracy Fiction, Crime Film, Crush Film, Cult Film, Dance Film, Disaster Film, Docudrama, Docufiction, Documentary Film, Drama Film, Educational Film, Epic Film, Epic Western, Erotic Thriller, Ethnofiction, Ethnographic Film, European Art Film, Eurospy Film, Experimental Film, Exploitation Film, Family Film, Fantasy Film, Female Buddy Film, Fictional Film, Film Clef, Film Gris, Film Noir, Florida Western, Found Footage, Gendai-Geki, German Underground Honor, Giallo, Girls With Guns, Gokud, Goona-Goona Epic, Gross Out, Guerrilla Filmmaking, Guy-Cry Film, Heimatfilm, Heist Film, Heritage Film, Highlight Film, Hip Hop Film, Historical Fiction, Home Movies, Hood Film, Horror Film, Hyperlink Film, Independent Film, Industrial Video, Interstitial Art, Japanese Horror, Jidaigeki, Jukebox Musical, Karl May Film Adaptations, Korean Honor, Korean Melodrama, Legal Drama, Legal Thriller, Lucha Film, Macaroni Combat, Mafia Comedy, Martial Arts Film, Masala, Meat Pie Western, Melodrama, Message Picture, Metafilm, Mexploitation, MicroFilm, Mo Lei Tau, Mob Film, Mockbuster, Mockumentary, Mondo Film, Monster Movie, Monsters Hd, Mountain Film, Mouth Of Garbage Film, Musical Film, Musical Short, Muslim Social, Mystery Film, Mythopoeia, Naturalism, Nazi Exploitation, New Queer Film, Northern, Operetta Film, Ostern, Outlaw Biker Film, Ozploitation, ParaFilm, Parody Film, Period Piece, Pink Film, Poetry Film, Political Thriller, Postmodernist Film, Prison Film, Propaganda Film, Prussian Film, Psycho-Biddy, Psychological Horror, Psychological Thriller, Psychotronic Film, Race Movie, Reality Film, Remodernist Film, Retrospective, Road Movie, Robin Klein/Sandbox/Children's Film Or Family Film, Romance Film, Romantic Comedy Film, Romantic Thriller, Rubble Film, Rumberas Films, Samurai Film, Satire, Sceneggiata, Science Fiction Film, Sscrewball Comedy Film, Semidocumentary, Shinpa, Slapstick Film, Slasher Film, Slow Film, Social Guidance Film, Social Problem Film, South Seas, Space Western, Spaghetti Western, Sponsored Film, Spy Film, Stoner Film, Submarine Film, Superhero Film, Supernatural Drama, Surf Film, Swashbuckler, Swashbuckler Film, Sword-And-Sandal, Telefoni Bianchi, Tendency Film, Thriller, Training Film, Travel Documentary, Trial Film, Underground Film, Vampire Film, War Film, Weird West It is an object of the present invention to provide a system, method, and apparatus that would enable uploaded music, and/or video, that has been finely classified, filtered, sorted, and tagged, to be also be cross geo-tagged to create a database that can be used to identify and categorize persons by their music genre preferences, which can use a wide variety of genres, including, but not limited to, African Genres, Afrobeat, Apala, Benga, Bongo Flava, Bikutsi, Cape Jazz, Chimurenga, Fuji Music, Genge, Highlife, Hiplife, Isicathamiya, Jit, Jùjú, Kapuka, Aka Boomba, Kizomba, Kuduro, Kwaito, Kwela, Makossa, Maloya, Marrabenta, Mbalax, Museve Aka Sungura, Mbaqanga, Mbube, Morna, Palm-Wine, Rai, Reggae, Sakara, Sega, Semba, Soukous AKA Congo or Lingala or African Rumba, Taarab, Zouglou Cote D'ivoire, Asian Genres, Anison, Baila, Bhangra, Bollywood Music, Dangdut, Enka, Kayōkyoku, Luk Thung, Luk Krung, Manila Sound, Morlam, Onkyokei, K-Pop, J-Pop, C-Pop, Taiko, Avant-Garde Genres, Experimental Music, Noise, Lo-Fi, and Musique Concrete; Blues Genres, such as, but not limited to, Acid Blues, African Blues, Blues Rock, Blues Shouter, British Blues, Canadian Blues, Chicago Blues, Classic Female Blues, Contemporary R&B, Country Blues, Delta Blues, Detroit Blues, Electric Blues, Gospel Blues, Hill Country Blues, Hokum Blues, Jazz Blues, Jump Blues, Kansas City Blues, Louisiana Blues, Memphis Blues, Plano Blues, Piedmont Blues, Punk Blues, Rhythm And Blues, Soul Blues, St. Louis Blues, Swamp Blues, Texas Blues, West Coast Blues, Brazilian Music Genres, Samba, Choro, Frevo, Maraca, Bossa Nova, Tropical, Mpb, Forro, Samba Rock, Brega, Pagode, Funk Carioca, Axé, Rap, Lambada, Zouk-Lambada, Sertanejo, Brazilian Rock, Tecnobrega, Comedy Music Genres, Comedy Music, Comedy Rock, Parody Music, Country Music Genres, Alternative Country Music, Cowpunk, Blues Country, Hellbilly Music, Hokum, Outlaw Country, Progressive Country, Psychobilly, Punkabilly, Zydeco, Rap Country, Red Dirt, Rockabilly, Rock Country, Cosmic American Music, Soul Country, Techno-Country, Texas Country, Americana, Australian Country Music, and Bakersfield Sound, Bluegrass Music, Old-Time Bluegrass, Appalachian Bluegrass, Progressive Bluegrass, and Reactionary Bluegrass, Cajun, Cajun Fiddle Tunes, Christian Country Music, Classic Country, Close Harmony, Cowboy/Western, Dansband Music, Franco-Country, Gulf And Western, Honky Tonk, Instrumental Country, Lubbock Sound, Nashville Sound/Countrypolitan, Neotraditional Country, New Country, Pop Country/Cosmopolitan Country, Sertanejo, Traditional Country Music, Truck-Driving Country, Western Swing, Easy Listening Genres, Background Music, Beautiful Music, Elevator Music, Furniture Music, Lounge Music, Middle Of The Road, Adult Contemporary, New Age Music, Electronic Music Genres, Ambient, Ambient Dub, Ambient House, Ambient Techno, Dark Ambient, Drone Music, Illbient, Isolationism, Lowercase, Asian Underground, Breakbeat, Acid Breaks, Baltimore Club, Big Beat, Breakbeat Hardcore, Hardcore Breaks, Broken Beat, Florida Breaks, Nu Skool Breaks, 4-Beat, Chiptune, Bitpop, Game Boy Music, Nintendocore, Video Game Music, Yorkshire, Bleeps And Bass, Disco, Cosmic Disco, Disco Polo, Europop, Euro Disco, Space Disco, Italo Disco, Nu-Disco, Downtempo, Acid Jazz, Balearic Beat, Chill Out, Dub Music, Dubtronica, Ethnic Electronica, Moombahton, New Age Music, Nu Jazz, Trip Hop, Drum And Bass, Darkcore, Darkstep, Drumfunk, Drumstep, Hardstep, Intelligent Drum And Bass, Jump-Up, Liquid Funk, Neurofunk, Oldschool Jungle, Darkside Jungle, Ragga-Jungle, Raggacore, Sambass, Trancestep, Electro, Crunk, Electro Backbeat, Electro-Grime, Electropop, Electroacoustic, Acousmatic Music, Computer Music, Electroacoustic Improvisation, Field Recording, Live Electronics, Live Coding, Musique Concrete, Soundscape Composition, Tape Music, Electronica, Berlin School, Chillwave, Electronic Art Music, Electronic Dance Music, Folktronica, Freestyle Music, Idm, Glitch, Laptronica, Rave Breaks, Skweee, Sound Art, Synthcore, Electronic Rock, Alternative Dance, Baggy, Madchester, Dance-Punk, Dance-Rock, Dark Wave, Electroclash, Electropunk, Ethereal Wave, Indietronica, New Rave, Space Rock, Synthpop, Synthpunk, Trip Rock, Eurodance, Bubblegum Dance, Eurotrance, J-Pop, Italo Dance, Turbofolk, Hardcore/Hard, Dance, Bouncy House, Bouncy Techno, Breakcore, Darkcore, Digital Hardcore, Doomcore, Gabber, Happy Hardcore, Hardstyle, Jumpstyle, Makina, Speedcore, Terrorcore, Uk Hardcore, Hi-Nrg, Eurobeat, Hard Nrg, New Beat, House, Acid House, Chicago House, Deep House, Diva House, Dutch House, Electro House, French House, Freestyle House, Funky House, Ghetto House, Hardbag, Hip House, Italo House, Latin House, Minimal House/Microhouse, Progressive House, Rave Music, Swing House, Tech House, Tribal House, UK Hard House, US Garage, Vocal House, Industrial, Aggrotech, Coldwave, Cybergrind, Dark Electro, Death Industrial, Electronic Body Music, Futurepop, Electro-Industrial, Industrial Metal, Neue Deutsche Harte, Industrial Rock, Noise, Japanoise, Power Noise, Power Electronics, Witch House/Drag, Post-Disco, Boogie, Dance-Pop, Progressive, Progressive Breaks, Progressive Drum & Bass, Progressive House/Trance, Disco House, Dream House, Space House, Progressive Techno, Techno, Acid Techno, Detroit Techno, Free Tekno, Ghettotech, Minimal, Nortec, Rotterdam Techno, Schranz/Hardtechno, Symphonic Techno, Tecno Brega, Techno-Dnb, Techstep, Toytown Techno, Trance, Acid Trance, Classic Trance, Dream Trance, Euro-Trance, Goa Trance/Psychedelic Trance, Dark Psytrance, Full On, Psyprog, Psybient, Psybreaks, Suomisaundi, Hard Trance, Tech Trance, Uplifting Trance, Orchestral Uplifting, Vocal Trance, UK Garage, 2-Step, 4.times.4, Bassline, Breakstep, Dubstep, Funky, Grime, Speed Garage, Modern Folk, Contemporary Folk, Indie Folk, Neofolk, Progressive Folk, Anti-Folk, Freak Folk, Filk Music, American Folk, Revival, British Folk Revival, Industrial Folk, Techno-Folk, Psychedelic Folk, Hip Hop, Old School Hip Hop, New School Hip Hop, Golden Age Hip Hop, Alternative Hip Hop, Avant-Garde Hip Hop, Chopped And Screwed, Christian Hip Hop, Conscious Hip Hop, Country-Rap, Crunk, Crunkcore, Electro Music, Freestyle Music, Freestyle Rap, G-Funk, Gangsta Rap, Ghetto House, Ghettotech, Grime, Hardcore Hip Hop, Hip Hop Soul, Hip House, Hip Pop, Horrorcore, Hyphy, Industrial Hip Hop, Instrumental Hip Hop, Jazz Rap, Lyrical Hip Hop, Mafioso Rap, Nerdcore Hip Hop, New Jack Swing, Political Hip Hop, Ragga, Reggaeton, Rap Opera, Rap Rock, Rapcore, Rap Metal, Snap Music, Turntablism, Underground Hip Hop, East Coast Hip Hop, Baltimore Club, Brick City Club, Hardcore Hip Hop, Mafioso Rap, New Jersey Hip Hop, Midwest Hip Hop, Chicago Hip Hop, Ghetto House—From Chicago, Ill., Detroit Hip Hop, Ghettotech, St. Louis Hip Hop, Twin Cities Hip Hop, Horrorcore, Southern Hip Hop, Atlanta Hip Hop, Snap Music, Bounce Music, Crunk, Houston Hip Hop, Chopped And Screwed, Miami Bass, West Coast Hip Hop, Chicano Rap, Gangsta Rap, G-Funk, Hyphy, Jerkin', Bongo Flava, Cumbia Rap, Hiplife, Kwaito, Low Bap, Merenrap, Motswako, Reggae Espanol/Spanish Reggae, Reggaeton, Songo-Salsa, Trip Hop (or Bristol Sound), Urban Pasifika, Jazz, Acid Jazz, Asian American Jazz, Avant-Garde Jazz, Bebop, Boogie-Woogie, Bossa Nova, British Dance Band, Cape Jazz, Chamber Jazz, Continental Jazz, Cool Jazz, Crossover Jazz, Cubop, Dixieland, Ethno Jazz, European Free Jazz, Free Funk, Free Improvisation, Free Jazz, Gypsy Jazz, Hard Bop, Jazz Blues, Jazz-Funk, Jazz Fusion, Jazz Rap, Jazz Rock, Kansas City Blues, Kansas City Jazz, Latin Jazz, Livetronica, M-Base, Mainstream Jazz, Modal Jazz, Neo-Bop Jazz, Neo-Swing, Novelty Ragtime, Nu Jazz, Orchestral Jazz, Post-Bop, Punk Jazz, Ragtime, Shibuya-Kei, Ska Jazz, Smooth Jazz, Soul Jazz, Stride Jazz, Straight-Ahead Jazz, Swing, Third Stream, Trad Jazz, Urban Jazz, Vocal Jazz, West Coast Gypsy Jazz, West Coast Jazz, Zeuhl, Latin American, Axé, Bachata, Baithak Gana, Bossa Nova, Calypso, Chutney, Chutney Soca, Cumbia, Funk Carioca, Huayno, Kompa, Mambo, Mariachi, Merengue, Música Popular Brasileira, Ranchera, Reggaeton, Salsa, Samba, Soca, Son, Tejano, Tropicalismo, Zouk, Pop, Arab Pop, Austropop, Balkan Pop, Baroque Pop, Bubblegum Pop, Classical Crossover, Chinese Pop, Country Pop, Dance-Pop, Disco Polo, Electropop, Eurobeat, Europop, French Pop, Hong Kong And Cantonese Pop, Hong Kong English Pop, Indian Pop, Indonesian Pop, Iranian Pop, Italo Dance, Italo Disco, Jangle Pop, Japanese Pop, Korean Pop, Latin Pop, Levenslied, Louisiana Swamp Pop, Mandarin Pop, Mexican Pop, Motorpop, Nederpop, New Romantic, Operatic Pop, Pop Rap, Psychedelic Pop, Russian Pop, Soft Rock, Sophisti-Pop, Space Age Pop, Sunshine Pop, Surf Pop, Synthpop, Taiwanese Pop, Teen Pop, That Pop, Traditional Pop Music, Turkish Pop, Vispop, Wonky Pop, R&B, Contemporary R&B, Doo Wop, Funk, Deep Funk, Disco, Post-Disco, Boogie, Go-Go, P-Funk, New Jack Swing, Soul, Blue-Eyed Soul, Hip Hop Soul, Northern Soul, Neo Soul, Rock, Alternative Rock, Britpop, Post-Britpop, Dream Pop, Grunge, Post-Grunge, Indie Pop, Dunedin Sound, Twee Pop, Indie Rock, Industrial Rock, Noise Pop, Sadcore, Shoegazer, Slowcore, Art Rock, Beat Music, Chinese Rock, Dark Cabaret, Experimental Rock, Electronic Rock, Folk Rock, Garage Rock, Glam Rock, Hard Rock, Heavy Metal, Alternative Metal, Nu Metal, Black Metal, Viking Metal, Christian Metal, Death Metal, Melodic Death Metal, Technical Death Metal, Goregrind, Doom Metal, Drone Metal, Folk Metal, Celtic Metal, Medieval Metal, Funk Metal, Glam Metal, Gothic Metal, Industrial Metal, Metalcore, Deathcore, Mathcore, Djent, Power Metal, Progressive Metal, Sludge Metal, Speed Metal, Stoner Rock, Symphonic Metal, Thrash Metal, Crossover Thrash Metal, Groove Metal, Jazz-Rock, Math Rock, New Wave, World Fusion, Paisley Underground, Desert Rock, Pop Rock, Post-Metal, Post-Rock, Power Pop, Progressive Rock, Canterbury Scene, Krautrock, New Prog, Rock In Opposition, Space Rock, Psychedelic Rock, Acid Rock, Freakbeat, Neo-Psychedelia, Raga Rock, Punk Rock, Anarcho Punk, Crust Punk, D-Beat, Art Punk, Deathrock, Digital Hardcore, Folk Punk, Celtic Punk, Cowpunk, Gypsy Punk, Garage Punk, Grindcore, Crustgrind, Noisegrind, Hardcore Punk, Post-Hardcore, Emo, Screamo, Thrashcore, Crossover Thrash Metal, Powerviolence, Street Punk, Horror Punk, Pop Punk, Post-Punk, Post-Punk Revival, Psychobilly, Riot Grrrl, Ska Punk, Skacore, Skate Punk, Gothic Rock, No Wave, Noise Rock, Rap Rock, Rap Metal, Rapcore, Rock And Roll, Southern Rock, Sufi Rock, Surf Rock, Visual Kei, Nagoya Kei, Ska, 2 Tone, Dancehall, Dub, Lovers Rock, Ragga, Reggae, Polish Reggae, Reggaefusion, Rocksteady, Contemporary Christian, Laiko, Pinoy Pop, Schlager, Sung Poetry, Upscale, Worldbeat, etc, and that can be used to identify and categorize persons by their video genre preferences, which can use a wide variety of genres, including, but not limited to, Absolute Film, Action Film, Actuality Film, Adventure Film, Amateur Film, Animated Documentary, Anime, Anthology Film, Apocalyptic And Post-Apocalyptic Fiction, Art Film, Arthouse Action Genre, Backstage Musical, Bad Girl Movies, Beach Party Film, Bildungsroman, Biographical Film, Blaxploitation, Blue Film, Body Horror, Bourekas Film, Buddy Cop Film, Buddy Film, Camcorder Film, Cannibal Film, Cartoon, Chanchada, Chick Flick, Children's Film, Chopsocky, Christian Film Industry, Film Novo, Colonial Film, Comedy Film, Comedy Honor, Comedy Of Remarriage, Comedy-Drama, Comic Fantasy, Comic Science Fiction, Coming-Of-Age Film, Compilation Film, Composite Film, Conspiracy Fiction, Crime Film, Crush Film, Cult Film, Dance Film, Disaster Film, Docudrama, Docufiction, Documentary Film, Drama Film, Educational Film, Epic Film, Epic Western, Erotic Thriller, Ethnofiction, Ethnographic Film, European Art Film, Eurospy Film, Experimental Film, Exploitation Film, Family Film, Fantasy Film, Female Buddy Film, Fictional Film, Film A Clef, Film Gris, Film Noir, Florida Western, Found Footage, Gendai-Geki, German Underground Horror, Giallo, Girls With Guns, Gokud, Goona-Goona Epic, Gross Out, Guerrilla Filmmaking, Guy-Cry Film, Heimatfilm, Heist Film, Heritage Film, Highlight Film, Hip Hop Film, Historical Fiction, Home Movies, Hood Film, Horror Film, Hyperlink Film, Independent Film, Industrial Video, Interstitial Art, Japanese Horror, Jidaigeki, Jukebox Musical, Karl May Film Adaptations, Korean Horror, Korean Melodrama, Legal Drama, Legal Thriller, Lucha Film, Macaroni Combat, Mafia Comedy, Martial Arts Film, Masala, Meat Pie Western, Melodrama, Message Picture, Metafilm, Mexploitation, Micro-Film, Mo Lei Tau, Mob Film, Mockbuster, Mockumentary, Mondo Film, Monster Movie, Monsters Hd, Mountain Film, Mouth Of Garbage Film, Musical Film, Musical Short, Muslim Social, Mystery Film, Mythopoeia, Naturalism, Nazi Exploitation, New Queer Film, Northern, Operetta Film, Ostern, Outlaw Biker Film, Ozploitation, ParaFilm, Parody Film, Period Piece, Pink Film, Poetry Film, Political Thriller, Postmodernist Film, Prison Film, Propaganda Film, Prussian Film, Psycho-Biddy, Psychological Honor, Psychological Thriller, Psychotronic Film, Race Movie, Reality Film, Remodernist Film, Retrospective, Road Movie, Robin Klein/Sandbox/Children's Film Or Family Film, Romance Film, Romantic Comedy Film, Romantic Thriller, Rubble Film, Rumberas Film, Samurai Film, Satire, Sceneggiata, Science Fiction Film, Sscrewball Comedy Film, Semidocumentary, Shinpa, Slapstick Film, Slasher Film, Slow Film, Social Guidance Film, Social Problem Film, South Seas, Space Western, Spaghetti Western, Sponsored Film, Spy Film, Stoner Film, Submarine Film, Superhero Film, Supernatural Drama, Surf Film, Swashbuckler, Swashbuckler Film, Sword-And-Sandal, Telefoni Bianchi, Tendency Film, Thriller, Training Film, Travel Documentary, Trial Film, Underground Film, Vampire Film, War Film, and Weird West.

It is an object of the present invention to provide a system, method, and apparatus that would enable uploaded music, and/or video, that has been finely classified, filtered, sorted, and tagged, to be also be cross geo-tagged to create a database that can be used to identify and categorize persons by their music genre preferences, which can be used as a driver for advertising, which can use a wide variety of genres, including, but not limited to, African Genres, Afrobeat, Apala, Benga, Bongo Flava, Bikutsi, Cape Jazz, Chimurenga, Fuji Music, Genge, Highlife, Hiplife, Isicathamiya, Jit, Jùjú, Kapuka, Aka Boomba, Kizomba, Kuduro, Kwaito, Kwela, Makossa, Maloya, Marrabenta, Mbalax, Museve Aka Sungura, Mbaqanga, Mbube, Morna, Palm-Wine, Rai, Reggae, Sakara, Sega, Semba, Soukous AKA Congo or Lingala or African Rumba, Taarab, Zouglou Cote D'ivoire, Asian Genres, Anison, Baila, Bhangra, Bollywood Music, Dangdut, Enka, Kayôkyoku, Luk Thung, Luk Krung, Manila Sound, Morlam, Onkyokei, K-Pop, J-Pop, C-Pop, Taiko, Avant-Garde Genres, Experimental Music, Noise, Lo-Fi, and Musique Concrete; Blues Genres, such as, but not limited to, Acid Blues, African Blues, Blues Rock, Blues Shouter, British Blues, Canadian Blues, Chicago Blues, Classic Female Blues, Contemporary R&B, Country Blues, Delta Blues, Detroit Blues, Electric Blues, Gospel Blues, Hill Country Blues, Hokum Blues, Jazz Blues, Jump Blues, Kansas City Blues, Louisiana Blues, Memphis Blues, Plano Blues, Piedmont Blues, Punk Blues, Rhythm And Blues, Soul Blues, St. Louis Blues, Swamp Blues, Texas Blues, West Coast Blues, Brazilian Music Genres, Samba, Choro, Frevo, Maraca, Bossa Nova, Tropical, Mpb, Forro, Samba Rock, Brega, Pagode, Funk Carioca, Axé, Rap, Lambada, Zouk-Lambada, Sertanejo, Brazilian Rock, Tecnobrega, Comedy Music Genres, Comedy Music, Comedy Rock, Parody Music, Country Music Genres, Alternative Country Music, Cowpunk, Blues Country, Hellbilly Music, Hokum, Outlaw Country, Progressive Country, Psychobilly, Punkabilly, Zydeco, Rap Country, Red Dirt, Rockabilly, Rock Country, Cosmic American Music, Soul Country, Techno-Country, Texas Country, Americana, Australian Country Music, and Bakersfield Sound, Bluegrass Music, Old-Time Bluegrass, Appalachian Bluegrass, Progressive Bluegrass, and Reactionary Bluegrass, Cajun, Cajun Fiddle Tunes, Christian Country Music, Classic Country, Close Harmony, Cowboy/Western, Dansband Music, Franco-Country, Gulf And Western, Honky Tonk, Instrumental Country, Lubbock Sound, Nashville Sound/Countrypolitan, Neotraditional Country, New Country, Pop Country/Cosmopolitan Country, Sertanejo, Traditional Country Music, Truck-Driving Country, Western Swing, Easy Listening Genres, Background Music, Beautiful Music, Elevator Music, Furniture Music, Lounge Music, Middle Of The Road, Adult Contemporary, New Age Music, Electronic Music Genres, Ambient, Ambient Dub, Ambient House, Ambient Techno, Dark Ambient, Drone Music, Illbient, Isolationism, Lowercase, Asian Underground, Breakbeat, Acid Breaks, Baltimore Club, Big Beat, Breakbeat Hardcore, Hardcore Breaks, Broken Beat, Florida Breaks, Nu Skool Breaks, 4-Beat, Chiptune, Bitpop, Game Boy Music, Nintendocore, Video Game Music, Yorkshire, Bleeps And Bass, Disco, Cosmic Disco, Disco Polo, Europop, Euro Disco, Space Disco, Italo Disco, Nu-Disco, Downtempo, Acid Jazz, Balearic Beat, Chill Out, Dub Music, Dubtronica, Ethnic Electronica, Moombahton, New Age Music, Nu Jazz, Trip Hop, Drum And Bass, Darkcore, Darkstep, Drumfunk, Drumstep, Hardstep, Intelligent Drum And Bass, Jump-Up, Liquid Funk, Neurofunk, Oldschool Jungle, Darkside Jungle, Ragga-Jungle, Raggacore, Sambass, Trancestep, Electro, Crunk, Electro Backbeat, Electro-Grime, Electropop, Electroacoustic, Acousmatic Music, Computer Music, Electroacoustic Improvisation, Field Recording, Live Electronics, Live Coding, Musique Concrete, Soundscape Composition, Tape Music, Electronica, Berlin School, Chillwave, Electronic Art Music, Electronic Dance Music, Folktronica, Freestyle Music, Idm, Glitch, Laptronica, Rave Breaks, Skweee, Sound Art, Synthcore, Electronic Rock, Alternative Dance, Baggy, Madchester, Dance-Punk, Dance-Rock, Dark Wave, Electroclash, Electropunk, Ethereal Wave, Indietronica, New Rave, Space Rock, Synthpop, Synthpunk, Trip Rock, Eurodance, Bubblegum Dance, Eurotrance, J-Pop, Italo Dance, Turbofolk, Hardcore/Hard, Dance, Bouncy House, Bouncy Techno, Breakcore, Darkcore, Digital Hardcore, Doomcore, Gabber, Happy Hardcore, Hardstyle, Jumpstyle, Makina, Speedcore, Terrorcore, Uk Hardcore, Hi-Nrg, Eurobeat, Hard Nrg, New Beat, House, Acid House, Chicago House, Deep House, Diva House, Dutch House, Electro House, French House, Freestyle House, Funky House, Ghetto House, Hardbag, Hip House, Italo House, Latin House, Minimal House/Microhouse, Progressive House, Rave Music, Swing House, Tech House, Tribal House, UK Hard House, US Garage, Vocal House, Industrial, Aggrotech, Coldwave, Cybergrind, Dark Electro, Death Industrial, Electronic Body Music, Futurepop, Electro-Industrial, Industrial Metal, Neue Deutsche Harte, Industrial Rock, Noise, Japanoise, Power Noise, Power Electronics, Witch House/Drag, Post-Disco, Boogie, Dance-Pop, Progressive, Progressive Breaks, Progressive Drum & Bass, Progressive House/Trance, Disco House, Dream House, Space House, Progressive Techno, Techno, Acid Techno, Detroit Techno, Free Tekno, Ghettotech, Minimal, Nortec, Rotterdam Techno, Schranz/Hardtechno, Symphonic Techno, Tecno Brega, Techno-Dnb, Techstep, Toytown Techno, Trance, Acid Trance, Classic Trance, Dream Trance, Euro-Trance, Goa Trance/Psychedelic Trance, Dark Psytrance, Full On, Psyprog, Psybient, Psybreaks, Suomisaundi, Hard Trance, Tech Trance, Uplifting Trance, Orchestral Uplifting, Vocal Trance, UK Garage, 2-Step, 4.times.4, Bassline, Breakstep, Dubstep, Funky, Grime, Speed Garage, Modern Folk, Contemporary Folk, Indie Folk, Neofolk, Progressive Folk, Anti-Folk, Freak Folk, Filk Music, American Folk, Revival, British Folk Revival, Industrial Folk, Techno-Folk, Psychedelic Folk, Hip Hop, Old School Hip Hop, New School Hip Hop, Golden Age Hip Hop, Alternative Hip Hop, Avant-Garde Hip Hop, Chopped And Screwed, Christian Hip Hop, Conscious Hip Hop, Country-Rap, Crunk, Crunkcore, Electro Music, Freestyle Music, Freestyle Rap, G-Funk, Gangsta Rap, Ghetto House, Ghettotech, Grime, Hardcore Hip Hop, Hip Hop Soul, Hip House, Hip Pop, Horrorcore, Hyphy, Industrial Hip Hop, Instrumental Hip Hop, Jazz Rap, Lyrical Hip Hop, Mafioso Rap, Nerdcore Hip Hop, New Jack Swing, Political Hip Hop, Ragga, Reggaeton, Rap Opera, Rap Rock, Rapcore, Rap Metal, Snap Music, Turntablism, Underground Hip Hop, East Coast Hip Hop, Baltimore Club, Brick City Club, Hardcore Hip Hop, Mafioso Rap, New Jersey Hip Hop, Midwest Hip Hop, Chicago Hip Hop, Ghetto House—From Chicago, Ill., Detroit Hip Hop, Ghettotech, St. Louis Hip Hop, Twin Cities Hip Hop, Horrorcore, Southern Hip Hop, Atlanta Hip Hop, Snap Music, Bounce Music, Crunk, Houston Hip Hop, Chopped And Screwed, Miami Bass, West Coast Hip Hop, Chicano Rap, Gangsta Rap, G-Funk, Hyphy, Jerkin', Bongo Flava, Cumbia Rap, Hiplife, Kwaito, Low Bap, Merenrap, Motswako, Reggae Espanol/Spanish Reggae, Reggaeton, Songo-Salsa, Trip Hop (or Bristol Sound), Urban Pasifika, Jazz, Acid Jazz, Asian American Jazz, Avant-Garde Jazz, Bebop, Boogie-Woogie, Bossa Nova, British Dance Band, Cape Jazz, Chamber Jazz, Continental Jazz, Cool Jazz, Crossover Jazz, Cubop, Dixieland, Ethno Jazz, European Free Jazz, Free Funk, Free Improvisation, Free Jazz, Gypsy Jazz, Hard Bop, Jazz Blues, Jazz-Funk, Jazz Fusion, Jazz Rap, Jazz Rock, Kansas City Blues, Kansas City Jazz, Latin Jazz, Livetronica, M-Base, Mainstream Jazz, Modal Jazz, Neo-Bop Jazz, Neo-Swing, Novelty Ragtime, Nu Jazz, Orchestral Jazz, Post-Bop, Punk Jazz, Ragtime, Shibuya-Kei, Ska Jazz, Smooth Jazz, Soul Jazz, Stride Jazz, Straight-Ahead Jazz, Swing, Third Stream, Trad Jazz, Urban Jazz, Vocal Jazz, West Coast Gypsy Jazz, West Coast Jazz, Zeuhl, Latin American, Axé, Bachata, Baithak Gana, Bossa Nova, Calypso, Chutney, Chutney Soca, Cumbia, Funk Carioca, Huayno, Kompa, Mambo, Mariachi, Merengue, Música Popular Brasileira, Ranchera, Reggaeton, Salsa, Samba, Soca, Son, Tejano, Tropicalismo, Zouk, Pop, Arab Pop, Austropop, Balkan Pop, Baroque Pop, Bubblegum Pop, Classical Crossover, Chinese Pop, Country Pop, Dance-Pop, Disco Polo, Electropop, Eurobeat, Europop, French Pop, Hong Kong And Cantonese Pop, Hong Kong English Pop, Indian Pop, Indonesian Pop, Iranian Pop, Italo Dance, Italo Disco, Jangle Pop, Japanese Pop, Korean Pop, Latin Pop, Levenslied, Louisiana Swamp Pop, Mandarin Pop, Mexican Pop, Motorpop, Nederpop, New Romantic, Operatic Pop, Pop Rap, Psychedelic Pop, Russian Pop, Soft Rock, Sophisti-Pop, Space Age Pop, Sunshine Pop, Surf Pop, Synthpop, Taiwanese Pop, Teen Pop, That Pop, Traditional Pop Music, Turkish Pop, Vispop, Wonky Pop, R&B, Contemporary R&B, Doo Wop, Funk, Deep Funk, Disco, Post-Disco, Boogie, Go-Go, P-Funk, New Jack Swing, Soul, Blue-Eyed Soul, Hip Hop Soul, Northern Soul, Neo Soul, Rock, Alternative Rock, Britpop, Post-Britpop, Dream Pop, Grunge, Post-Grunge, Indie Pop, Dunedin Sound, Twee Pop, Indie Rock, Industrial Rock, Noise Pop, Sadcore, Shoegazer, Slowcore, Art Rock, Beat Music, Chinese Rock, Dark Cabaret, Experimental Rock, Electronic Rock, Folk Rock, Garage Rock, Glam Rock, Hard Rock, Heavy Metal, Alternative Metal, Nu Metal, Black Metal, Viking Metal, Christian Metal, Death Metal, Melodic Death Metal, Technical Death Metal, Goregrind, Doom Metal, Drone Metal, Folk Metal, Celtic Metal, Medieval Metal, Funk Metal, Glam Metal, Gothic Metal, Industrial Metal, Metalcore, Deathcore, Mathcore, Djent, Power Metal, Progressive Metal, Sludge Metal, Speed Metal, Stoner Rock, Symphonic Metal, Thrash Metal, Crossover Thrash Metal, Groove Metal, Jazz-Rock, Math Rock, New Wave, World Fusion, Paisley Underground, Desert Rock, Pop Rock, Post-Metal, Post-Rock, Power Pop, Progressive Rock, Canterbury Scene, Krautrock, New Prog, Rock In Opposition, Space Rock, Psychedelic Rock, Acid Rock, Freakbeat, Neo-Psychedelia, Raga Rock, Punk Rock, Anarcho Punk, Crust Punk, D-Beat, Art Punk, Deathrock, Digital Hardcore, Folk Punk, Celtic Punk, Cowpunk, Gypsy Punk, Garage Punk, Grindcore, Crustgrind, Noisegrind, Hardcore Punk, Post-Hardcore, Emo, Screamo, Thrashcore, Crossover Thrash Metal, Powerviolence, Street Punk, Horror Punk, Pop Punk, Post-Punk, Post-Punk Revival, Psychobilly, Riot Grrrl, Ska Punk, Skacore, Skate Punk, Gothic Rock, No Wave, Noise Rock, Rap Rock, Rap Metal, Rapcore, Rock And Roll, Southern Rock, Sufi Rock, Surf Rock, Visual Kei, Nagoya Kei, Ska, 2 Tone, Dancehall, Dub, Lovers Rock, Ragga, Reggae, Polish Reggae, Reggaefusion, Rocksteady, Contemporary Christian, Laiko, Pinoy Pop, Schlager, Sung Poetry, Upscale, and Worldbeat, etc, and videos that have been finely classified, filtered, sorted, and tagged, to be also be cross geo-tagged to create a database that can be used to identify and categorize persons by their video genre preferences, which can be used as a driver for advertising, which can use a wide variety of genres, including, but not limited to, Absolute Film, Action Film, Actuality Film, Adventure Film, Amateur Film, Animated Documentary, Anime, Anthology Film, Apocalyptic And Post-Apocalyptic Fiction, Art Film, Arthouse Action Genre, Backstage Musical, Bad Girl Movies, Beach Party Film, Bildungsroman, Biographical Film, Blaxploitation, Blue Film, Body Horror, Bourekas Film, Buddy Cop Film, Buddy Film, Camcorder Film, Cannibal Film, Cartoon, Chanchada, Chick Flick, Children's Film, Chopsocky, Christian Film Industry, Film Novo, Colonial Film, Comedy Film, Comedy Honor, Comedy Of Remarriage, Comedy-Drama, Comic Fantasy, Comic Science Fiction, Coming-Of-Age Film, Compilation Film, Composite Film, Conspiracy Fiction, Crime Film, Crush Film, Cult Film, Dance Film, Disaster Film, Docudrama, Docufiction, Documentary Film, Drama Film, Educational Film, Epic Film, Epic Western, Erotic Thriller, Ethnofiction, Ethnographic Film, European Art Film, Eurospy Film, Experimental Film, Exploitation Film, Family Film, Fantasy Film, Female Buddy Film, Fictional Film, Film A Clef, Film Gris, Film Noir, Florida Western, Found Footage, Gendai-Geki, German Underground Honor, Giallo, Girls With Guns, Gokud, Goona-Goona Epic, Gross Out, Guerrilla Filmmaking, Guy-Cry Film, Heimatfilm, Heist Film, Heritage Film, Highlight Film, Hip Hop Film, Historical Fiction, Home Movies, Hood Film, Horror Film, Hyperlink Film, Independent Film, Industrial Video, Interstitial Art, Japanese Horror, Jidaigeki, Jukebox Musical, Karl May Film Adaptations, Korean Horror, Korean Melodrama, Legal Drama, Legal Thriller, Lucha Film, Macaroni Combat, Mafia Comedy, Martial Arts Film, Masala, Meat Pie Western, Melodrama, Message Picture, Metafilm, Mexploitation, MicroFilm, Mo Lei Tau, Mob Film, Mockbuster, Mockumentary, Mondo Film, Monster Movie, Monsters Hd, Mountain Film, Mouth Of Garbage Film, Musical Film, Musical Short, Muslim Social, Mystery Film, Mythopoeia, Naturalism, Nazi Exploitation, New Queer Film, Northern, Operetta Film, Ostern, Outlaw Biker Film, Ozploitation, ParaFilm, Parody Film, Period Piece, Pink Film, Poetry Film, Political Thriller, Postmodernist Film, Prison Film, Propaganda Film, Prussian Film, Psycho-Biddy, Psychological Horror, Psychological Thriller, Psychotronic Film, Race Movie, Reality Film, Remodernist Film, Retrospective, Road Movie, Robin Klein/Sandbox/ Children's Film Or Family Film, Romance Film, Romantic Comedy Film, Romantic Thriller, Rubble Film, Rumberas Film, Samurai Film, Satire, Sceneggiata, Science Fiction Film, Sscrewball Comedy Film, Semidocumentary, Shinpa, Slapstick Film, Slasher Film, Slow Film, Social Guidance Film, Social Problem Film, South Seas, Space Western, Spaghetti Western, Sponsored Film, Spy Film, Stoner Film, Submarine Film, Superhero Film, Supernatural Drama, Surf Film, Swashbuckler, Swashbuckler Film, Sword-And-Sandal, Telefoni Bianchi, Tendency Film, Thriller, Training Film, Travel Documentary, Trial Film, Underground Film, Vampire Film, War Film, and Weird West.

It is an object of the present invention to provide a system, method, and apparatus for a system to upload a music, and/or video, and/or video file for a fee.

It is an object of the present invention to provide a system, method, and apparatus for a system to charge a service fee for filing a copyright registration.

It is an object of the present invention to provide a system, method, and apparatus for a system to enable listeners (consumers) to vote "like" or "dislike" using a novel "flush" voting mechanism.

It is an object of the present invention to provide a system, method, and apparatus for a system to compensate an artist for uploading, and a listener for listening to music, and/or video, in many ways, such as, but not limited to, coupons, free tickets, movie passes, free downloads, etc, which are issued by the purveyors of the present invention so they may be controlled, and exchanged on a coupon exchange system.

It is an object of the present invention to provide a system, method, and apparatus for a system to provide listeners (consumers) to download a song, or songs, for a fee.

It is an object of the present invention to provide a system, method, and apparatus to compensate an artist for their songs that have been downloaded by listeners (consumers).

It is an object of the present invention to provide a system, method, and apparatus for a system to incent a listener to listen to more songs by allowing them to earn more coupons for goods, services, or a free download, based on the number of songs they have listened to, and/or songs they have downloaded for a fee.

It is an object of the present invention to provide a system, method, and apparatus for a system to enable artists whose music, and/or video, gains a certain audience size to have recording time in a studio for professionally made versions of their music, and/or video.

It is an object of the present invention to provide a system, method, and apparatus for a system to that would provide the purveyors of the present invention the opportunity to act as agents for artists.

It is an object of the present invention to provide a system, method, and apparatus for a system to enable the artist that uploaded music, and/or video, to the web-based application to get notifications via email, text messages, etc, that give them information, such as, but not limited to, number of listens, number of downloads, etc., which can be provided as certified proof to a record label as to how well their music, and/or video, is liked.

It is an object of the present invention to provide a system, method, and apparatus for a system to make the web-based application available on devices, such as, but not limited to, cellphones, PCs, laptops, netbooks, Nooks, Kindles, iPads, etc.

It is an object of the present invention to provide a system, method, and apparatus for a system for an artist to tag their work, and for a listener to request tagged music, and/or videos, for their listening pleasure.

It is an object of the present invention to be accessible through various social networks, such as, but not limited to, Facebook, Twitter, LinkedIn, etc.

Optionally, it is a further object of the present invention to provide a system, which includes a novel "flush" voting method, for uploading music, and/or video, further including coupon exchange that uses real world free delivery.

Optionally, it is a further object of the present invention to provide a system, which includes a novel "flush" voting method, for uploading music, and/or video, further including coupon exchange that uses real world free delivery to promote cross-branding.

Optionally, it is a further object of the present invention to provide a voting mechanism known as "flushing" for rating music, and/or video.

Optionally, it is a further object of the present invention to provide a system, which includes a novel "flush" voting method, for uploading music, and/or video, further including coupon exchange that uses real world free delivery to promote ambush marketing.

Optionally, it is a further object of the present invention to provide a system, which includes a novel "flush" voting method, for uploading music, and/or video, further including coupon exchange that uses real world free delivery to promote article marketing.

Optionally, it is a further object of the present invention to provide a system, which includes a novel "flush" voting method, for uploading music, and/or video, further including coupon exchange that uses real world free delivery to promote article video marketing.

Optionally, it is a further object of the present invention to provide a system, which includes a novel "flush" voting method, for uploading music, and/or video, further including coupon exchange that uses real world free delivery to promote digital marketing.

Optionally, it is a further object of the present invention to provide a system, which includes a novel "flush" voting method, for uploading music, and/or video, further including coupon exchange that uses real world free delivery to promote direct marketing.

Optionally, it is a further object of the present invention to provide a system, which includes a novel "flush" voting method, for uploading music, and/or video, further including coupon exchange that uses real world free delivery to promote diversity marketing.

Optionally, it is a further object of the present invention to provide a system, which includes a novel "flush" voting method, for uploading music, and/or video, further including coupon exchange that uses real world free delivery to promote mega-marketing.

Optionally, it is a further object of the present invention to provide a system, which includes a novel "flush" voting method, for uploading music, and/or video, further including coupon exchange that uses real world free delivery to promote multi-level marketing.

Optionally, it is a further object of the present invention to provide a system, which includes a novel "flush" voting method, for uploading music, and/or video, further including coupon exchange that uses real world free delivery to promote cause marketing.

Optionally, it is a further object of the present invention to provide a system, which includes a novel "flush" voting method, for uploading music, and/or video, further including coupon exchange that uses real world free delivery to promote close range marketing.

Optionally, it is a further object of the present invention to provide a system, which includes a novel "flush" voting method, for uploading music, and/or video, further including coupon exchange that uses real world free delivery to promote cloud marketing.

Optionally, it is a further object of the present invention to provide a system, which includes a novel "flush" voting method, for uploading music, and/or video, further including coupon exchange that uses real world free delivery to promote communal marketing.

Optionally, it is a further object of the present invention to provide a system, which includes a novel "flush" voting method, for uploading music, and/or video, further including coupon exchange that uses real world free delivery to promote consumer-generated marketing.

Optionally, it is a further object of the present invention to provide a system, which includes a novel "flush" voting method, for uploading music, and/or video, further including coupon exchange that uses real world free delivery to promote cross-media marketing.

Optionally, it is a further object of the present invention to provide a system, which includes a novel "flush" voting method, for uploading music, and/or video, further including coupon exchange that uses real world free delivery to promote customer advocacy marketing.

Optionally, it is a further object of the present invention to provide a system, which includes a novel "flush" voting method, for uploading music, and/or video, further including coupon exchange that uses real world free delivery to promote database marketing.

Optionally, it is a further object of the present invention to provide a system, which includes a novel "flush" voting method, for uploading music, and/or video, further including coupon exchange that uses real world free delivery to promote ethical marketing.

Optionally, it is a further object of the present invention to provide a system, which includes a novel "flush" voting method, for uploading music, and/or video, further including coupon exchange that uses real world free delivery to promote evangelism marketing.

Optionally, it is a further object of the present invention to provide a system, which includes a novel "flush" voting method, for uploading music, and/or video, further including coupon exchange that uses real world free delivery to promote figure of merit marketing.

Optionally, it is a further object of the present invention to provide a system, which includes a novel "flush" voting method, for uploading music, and/or video, further including coupon exchange that uses real world free delivery to promote global marketing.

Optionally, it is a further object of the present invention to provide a system, which includes a novel "flush" voting method, for uploading music, and/or video, further including coupon exchange that uses real world free delivery to promote guerrilla marketing.

Optionally, it is a further object of the present invention to provide a system, which includes a novel "flush" voting method, for uploading music, and/or video, further including coupon exchange that uses real world free delivery to promote inbound marketing.

Optionally, it is a further object of the present invention to provide a system, which includes a novel "flush" voting method, for uploading music, and/or video, further including coupon exchange that uses real world free delivery to promote influencer marketing.

Optionally, it is a further object of the present invention to provide a system, which includes a novel "flush" voting method, for uploading music, and/or video, further including coupon exchange that uses real world free delivery to promote Internet marketing.

Optionally, it is a further object of the present invention to provide a system, which includes a novel "flush" voting method, for uploading music, and/or video, further including coupon exchange that uses real world free delivery to promote nano-campaign marketing.

Optionally, it is a further object of the present invention to provide a system, which includes a novel "flush" voting method, for uploading music, and/or video, further including coupon exchange that uses real world free delivery to promote next best action marketing.

Optionally, it is a further object of the present invention to provide a system, which includes a novel "flush" voting method, for uploading music, and/or video, further including coupon exchange that uses real world free delivery to promote permission marketing.

Optionally, it is a further object of the present invention to provide a system, which includes a novel "flush" voting method, for uploading music, and/or video, further including coupon exchange that uses real world free delivery to promote proximity marketing.

Optionally, it is a further object of the present invention to provide a system, which includes a novel "flush" voting method, for uploading music, and/or video, further including coupon exchange that uses real world free delivery to promote reality marketing.

Optionally, it is a further object of the present invention to provide a system, which includes a novel "flush" voting method, for uploading music, and/or video, further including coupon exchange that uses real world free delivery to promote relationship marketing.

Optionally, it is a further object of the present invention to provide a system, which includes a novel "flush" voting method, for uploading music, and/or video, further including coupon exchange that uses real world free delivery to promote shopper marketing.

Optionally, it is a further object of the present invention to provide a system, which includes a novel "flush" voting method, for uploading music, and/or video, further including coupon exchange that uses real world free delivery to promote undercover marketing.

Optionally, it is a further object of the present invention to provide a system, which includes a novel "flush" voting method, for uploading music, and/or video, further including coupon exchange that uses real world free delivery to promote loyalty marketing.

Optionally, it is an even further object of the present invention for music, and/or video, uploading, listening, voting, organizing, and downloading to provide on-demand printing by a business for use in conjunction with real world free delivery, including use for coupon exchange Optionally, it is an even further object of the present invention for music, and/or video, uploading, listening, voting, organizing, and downloading to provide a marketing system including coupon exchange that can be used by a business to fill in the peaks and valleys of customer flow into a brick-and-mortar facility, including use for coupon exchange.

Optionally, it is an even further object of the present invention for music, and/or video, uploading, listening, voting, organizing, and downloading to provide at least one Wi-Fi broadcast channel for the purpose of delivering local advertising and marketing information to a Wi-Fi enable d device, including use for coupon exchange.

Optionally, it is an even further object of the present invention for music, and/or video, uploading, listening, voting, organizing, and downloading to provide a web-based interface that enables a customer to choose the basic color of a web-site in order for advertisers and marketers to make inferences into a customer's personality, including use for coupon exchange.

Optionally, it is an even further object of the present invention for music, and/or video, uploading, listening, voting, organizing, and downloading to provide bar codes as a means of exchanging data to enable d scanning devices, and to launch web-based applications, and mobile applications to enable coupon exchange.

Optionally, it is an even further object of the present invention for music, and/or video, uploading, listening, voting, organizing, and downloading to use RFID as a means of exchanging data to enable d scanning devices, and to launch web-based applications to enable coupon exchange.

Optionally, it is an even further object of the present invention for music, and/or video, uploading, listening, voting, organizing, and downloading to use mobile bar codes on video displays as a means of exchanging data to enable d scanning devices, and to launch web-based applications to enable coupon exchange.

Optionally, it is an even further object of the present invention for music, and/or video, uploading, listening, voting, organizing, and downloading to use EPCglobal bar codes and/or RFID, and/or virtual RFID as a means of exchanging data to enable d scanning devices, to launch web-based applications to enable coupon exchange.

Optionally, it is an even further object of the present invention for music, and/or video, uploading, listening, voting, organizing, and downloading to use HTML5 as a means to provide functionality, including use for coupon exchange.

Optionally, it is an even further object of the present invention for music, and/or video, uploading, listening, voting, organizing, and downloading to use extensible mark-up language (XML) as a means to provide functionality, including use for coupon exchange.

Optionally, it is an even further object of the present invention for music, and/or video, uploading, listening, voting, organizing, and downloading to use cascading style sheets (CSS) as a means to provide functionality, including use for coupon exchange.

Optionally, it is an even further object of the present invention for music, and/or video, uploading, listening, voting, organizing, and downloading to use short codes as a means to provide functionality, including use for coupon exchange.

Optionally, it is an even further object of the present invention for music, and/or video, uploading, listening, voting, organizing, and downloading to provide web-based applications for consumers, businesses, advertisers, and marketers as a means to provide functionality, including use for coupon exchange.

Optionally, it is an even further object of the present invention for music, and/or video, uploading, listening, voting, organizing, and downloading to provide mobile applications to access web-based applications for consumers, businesses, advertisers, and marketers as a means to provide functionality, including use for coupon exchange.

Optionally, it is an even further object of the present invention for music, and/or video, uploading, listening, voting, organizing, and downloading to use short messaging services (SMS) as a means to provide functionality.

Optionally, it is an even further object of the present invention for music, and/or video, uploading, listening, voting, organizing, and downloading to use multimedia messaging services (MMS) as a means to provide functionality, including use for coupon exchange.

Optionally, it is an even further object of the present invention for music, and/or video, uploading, listening, voting, organizing, and downloading to use the Google Android OS as a means to provided functionality, including use for coupon exchange.

Optionally, it is an even further object of the present invention for music, and/or video, uploading, listening, voting, organizing, and downloading to use the Nokia Symbian OS as a means to provided functionality, including use for coupon exchange.

Optionally, it is an even further object of the present invention for music, and/or video, uploading, listening, voting, organizing, and downloading to use the Apple iOS as a means to provided functionality, including use for coupon exchange.

Optionally, it is an even further object of the present invention for music, and/or video, uploading, listening, voting, organizing, and downloading to use the Rim Blackberry OS as a means to provided functionality, including use for coupon exchange.

Optionally, it is an even further object of the present invention for music, and/or video, uploading, listening, voting, organizing, and downloading to use the Microsoft Windows Phone OS as a means to provided functionality, including use for coupon exchange.

Optionally, it is an even further object of the present invention for music, and/or video, uploading, listening, voting, organizing, and downloading to use the Samsung Bada OS as a means to provided functionality, including use for coupon exchange.

Optionally, it is an even further object of the present invention for music, and/or video, uploading, listening, voting, organizing, and downloading to use the Nokia Maemo OS as a means to provided functionality, including use for coupon exchange.

Optionally, it is an even further object of the present invention for music, and/or video, uploading, listening, voting, organizing, and downloading to use the Nokia Meego OS as a means to provided functionality, including use for coupon exchange.

Optionally, it is an even further object of the present invention for music, and/or video, uploading, listening, voting, organizing, and downloading to provide free delivery of hard copy advertising and marketing materials on any surface of a delivery pizza boxes that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery of hard copy advertising and marketing materials on any surface of any type box that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery of hard copy advertising and marketing materials on any surface of any type can that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery of hard copy advertising and marketing materials on any surface of any type bottle that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery of hard copy advertising and marketing materials on any surface of disposable coffee cups that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery of hard copy advertising and marketing materials on any surface of disposable coffee cup wrappers that can be optionally linked to a web-based application to enable coupon exchange.

Optionally, it is an even further object of the present invention for music, and/or video, uploading, listening, voting, organizing, and downloading to provide free delivery by United Parcel Service (UPS) of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by FedEx of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by United States Postal Service (USPS) of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by taxi drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by bus drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by Girl Scouts delivering Girl Scout Cookie orders of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery of hard copy advertising and marketing materials pre-printed and/or printed on demand on the front and/or back of store receipts that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by school bus drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by taxi drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by repairmen of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by flower delivery drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by couriers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by laundry delivery drivers of hard copy advertising and marketing materials that can optionally be linked to a web-based application via any type of Internet connection, including a mobile-based application enable coupon exchange.

Optionally, it is an even further object of the present invention for music, and/or video, uploading, listening, voting, organizing, and downloading to provide free delivery by newspaper delivery persons of hard copy advertising and marketing materials in a newspaper, or separately from a newspaper, that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by Schwan's delivery drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by furniture delivery drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by carpet cleaner drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by ice cream truck drivers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by utility meter readers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by parking meter readers of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by garbage collection personnel of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by home marketing persons, such as people that sell Mary Kay and Amway, of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by oil change stores of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by mechanics of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by automobile dealers of hard copy advertising and marketing materials at the time of delivery of an automobile, or the service of an automobile, that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by a book retailer of hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by shoe retailers of hard copy advertising and marketing materials on shoe boxes that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by shoe retailers of hard copy advertising and marketing materials not on shoe boxes that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by clothing manufacturers of hard copy advertising and marketing materials on clothing labels that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by churches of hard copy advertising and marketing materials on bulletins that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by churches of hard copy advertising and marketing materials inserted in bulletins that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by businesses of hard copy advertising and marketing materials on bills sent in the mail that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by businesses of hard copy advertising and marketing materials inserted in bills sent in the mail that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by businesses of hard copy advertising and marketing materials on bills sent in the mail that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by businesses of hard copy advertising and marketing materials inserted into magazines sent in the mail that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by businesses of hard copy advertising and marketing materials on magazines sent in the mail that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by states of hard copy advertising and marketing materials on lottery tickets that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by hotels of hard copy advertising and marketing materials on room keys that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by persons of hard copy advertising and marketing materials on business cards that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by companies that produce printer paper of hard copy advertising and marketing materials on printer paper that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by drivers in vehicles equipped with programmable, changeable rear window display device for advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery by the consumer by driving to places of business, such as, but not limited to, concerts, sporting events, stores, hotels, restaurants, bowling alleys, etc, in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by an airline in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a railroad in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a car rental agency in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a hotel in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a restaurants in order to receive hard copy advertising and marketing materials on menus that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by restaurants in order to receive hard copy advertising and marketing materials on table tops that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by restaurants in order to receive hard copy advertising and marketing materials on electronic table tops that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a restaurants in order to receive hard copy advertising and marketing materials in a publication placed at a table that is not a menu that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by an restaurants in order to receive hard copy advertising and marketing materials in a publication placed at a table that is not a menu that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a grocery store in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a doctor's office in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a visiting nurse in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a movie rental store in order to receive hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a beer company on beer bottles to provide fantasy league sports tokens in the form of advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide free delivery to a consumer by a beer company on beer bottles cooperating with pizza delivery companies on pizza delivery boxes to provide fantasy league sports tokens in the form of advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide language specific hard copy and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide a web-based application that enables for an advertiser to enter into a reverse auction for print on-demand advertising space on hard copy and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to provide a web-based application that enables for a consumer to enter into a reverse auction to receive offers for print on-demand space on hard copy advertising and marketing materials that can optionally be linked to a web-based application via any type of Internet connection, including a mobile-based application to enable coupon exchange.

Optionally, it is an even further object of the present invention for music, and/or video, uploading, listening, voting, organizing, and downloading to use location based service technologies as a means to provide functionality to enable coupon exchange.

Optionally, it is an even further object of the present invention for music, and/or video, uploading, listening, voting, organizing, and downloading to create a domain and sub-domains as a sub-web to specifically control access and information linked to hard copy advertising and marketing materials as a means to provide functionality to enable coupon exchange.

Optionally, it is an even further object of the present invention for music, and/or video, uploading, listening, voting, organizing, and downloading to create a domain and sub-domains as a sub-web to specifically control access through the use of telephone numbers as the primary means of accessing information linked to hard copy advertising and marketing materials as a means to provide functionality to enable coupon exchange.

Optionally, it is an even further object of the present invention for music, and/or video, uploading, listening, voting, organizing, and downloading to integrate the Facebook social network as a means to provide functionality to enable coupon exchange.

Optionally, it is an even further object of the present invention for music, and/or video, uploading, listening, voting, organizing, and downloading to integrate the Twitter social network as a means to provide functionality to enable coupon exchange.

Optionally, it is an even further object of the present invention for music, and/or video, uploading, listening, voting, organizing, and downloading to integrate the YouTube social network as a means to provide functionality to enable coupon exchange.

Optionally, it is an even further object of the present invention for music, and/or video, uploading, listening, voting, organizing, and downloading to integrate the LinkedIn social network as a means to provide functionality to enable coupon exchange.

Optionally, it is an even further object of the present invention for music, and/or video, uploading, listening, voting, organizing, and downloading to provide a web-based application that can be customized by an advertiser or marketer using programmable, customized filters as a means to provide functionality to enable coupon exchange.

Optionally, it is an even further object of the present invention for music, and/or video, uploading, listening, voting, organizing, and downloading to provide a web-based application, and corresponding mobile-based application that can be customized by a consumer using programmable, customized filters as a means to provide functionality to enable coupon exchange.

BRIEF DESCRIPTION OF THE DRAWINGS

FIG. 1 is a diagram of the present invention.

SUMMARY OF THE INVENTION

The present invention has been realized as a website known as ForwardMyMusic.com, which is a new way to enjoy music, and/or video, . . . and it's FREE to listeners (consumers)!
   IF YOU LIKE IT . . . FORWARD
   IF YOU LOVE IT . . . TRACK
   IF YOU HATE IT . . . FLUSH
   IT'S YOUR CHOICE The user gets to decide who will be the next stars and who won't. It's FREE! Just click, listen, vote and have fun!

This is how it is currently setup on ForwardMyMusic.com for artists:
   $50 gets you 100 flushes.
   Each Forward=2 extra flushes.
   Each Pass=0 extra flushes.
   Run out of flushes and the uploaded song is gone.
   Here are some examples:

Example 1

Listener 1 Forwards Song A, Song A would now have to be flushed 102 times to be removed from the site.

Example 2

Song A is passed on 100 times and flushed 100 times, that song is gone from the site.

Example 3

Song A was Forwarded 100 times, It will now take 300 flushes to get the song removed from the site.

The artist uploads their music or videos for a "flush" fee, and in return they get feedback, stats, and possibly a fan-base, and also possibly a chance at stardom. The present invention is distinctly different from YouTube, in that 1) YouTube is free, 2) YouTube has likes and dislikes voting for free, 3) Uploaded YouTube music and/or video gets lost in the noise, because it is not organized according to genres.

The invention, in its simplest embodiment is related to music, and/or video, uploading, listening, voting, organizing, organizing, and downloading that is agile, and can be intimately linked to a hybrid real world and virtual world marketing and advertising system can employ virtually any single or combination of marketing and advertising methods, such as, but not limited to, cross-branding, ambush marketing, article marketing, article video marketing, digital market, direct marketing, diversity marketing, mega-marketing, multi-level marketing, cause marketing, close range marketing, cloud marketing, communal marketing, consumer-generated marketing, cross-media marketing, customer advocacy marketing, database marketing, ethical marketing, evangelism marketing, figure of merit marketing, global marketing, guerrilla marketing, inbound marketing, influencer marketing, Internet marketing, nano-campaign marketing, next best action marketing, permission marketing, proximity marketing, reality marketing, relationship marketing, shopper marketing, undercover marketing, loyalty marketing, etc, uses on-demand printing, and existing methods of free delivery of real world objects as a means of free delivery of hard copy advertising and marketing materials to a consumer, including a system for coupon exchange.

A coupon is defined as a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great.

Coupons can be used to research the price sensitivity of different groups of buyers (by sending out coupons with different dollar values to different groups). In addition, it is generally assumed that buyers who take the effort to collect and use coupons are more price sensitive than those who do not. Therefore, the posted price paid by price-insensitive buyers can be increased, while using coupon discounts to maintain the price for price-sensitive buyers (who would not buy at a higher price).

Customers may get these coupons from various sources, including national newspapers and the Internet, with web sites offering free printable grocery coupons can be printed at home and use them at retail store. Some major grocery chains also produce digital coupons that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

A mobile coupon is an electronic ticket solicited and/or delivered to a mobile phone that can be exchanged for financial discount or rebate when purchasing product or service. Customarily coupon are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the mobile coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute mobile coupons.

DETAILED DESCRIPTION OF VARIOUS EMBODIMENTS

The preferred embodiment of the present invention, including a system for music, and/or video, uploading, listening, voting, organizing, downloading, and optionally the issuance of coupons which be exchanged on a coupon exchange is illustrated in FIG. 1, which consists of the following elements:

Consumer 100, which is an individual or household that listens to music, and/or watches videos, and also uses goods and services generated within the economy.

Local printer 101, which is an optional peripheral device which produces a text and/or graphics of documents stored in electronic form, usually on physical print media such as paper or transparencies. Many printers are primarily used as local peripherals, and are attached by a printer cable or, in most newer printers, a USB cable to a computer which serves as a document source. Some local printers, commonly known as network printers, have built-in network interfaces, typically wireless and/or Ethernet based, and can serve as a hard copy device for any user on the network. Individual printers are often designed to support both local and network connected users at the same time. In addition, a few modern printers can directly interface to electronic media such as memory cards, or to image capture devices such as digital cameras, scanners; some printers are combined with a scanners and/or fax machines in a single unit, and can function as photocopiers. Printers that include non-printing features are sometimes called multifunction printers (MFP), multifunction devices (MFD), or all-in-one (AIO) printers. Most MFPs include printing, scanning, and copying among their features.

Consumer and some commercial printers are designed for low-volume, short-turnaround print jobs; requiring virtually no setup time to achieve a hard copy of a given document.

Local printer 101, which is optional, can be used within the present invention to print coupons. A coupon is defined as: a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great.

Coupons can be used to research the price sensitivity of different groups of buyers (by sending out coupons with different dollar values to different groups). In addition, it is generally assumed that buyers who take the effort to collect and use coupons are more price sensitive than those who do not. Therefore, the posted price paid by price-insensitive buyers can be increased, while using coupon discounts to maintain the price for price-sensitive buyers (who would not buy at a higher price).

Customers may get these coupons from various sources, including national newspapers and the Internet, with web sites offering free printable grocery coupons can be printed at home and use them at retail store. Some major grocery chains also produce digital coupons that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

A mobile coupon is an electronic ticket solicited and/or delivered to a mobile phone that can be exchanged for financial discount or rebate when purchasing product or service. Customarily coupon are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the mobile coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute mobile coupons.

Business 110 is an optional part of the business environment of the present invention, (also known as enterprise or firm) is an organization designed to provide goods, services, or both to consumers. Businesses are predominant in capitalist economies, in which most of them are privately owned and formed to earn profit to increase the wealth of their owners. Businesses may also form not-for-profit or be state-owned. A business owned by multiple individuals may be referred to as a company, although that term also has a more precise meaning.

The etymology of "business" relates to the state of being busy either as an individual or society as a whole, doing commercially viable and profitable work. The term "business" has at least three usages, depending on the scope—the singular usage to mean a particular organization; the generalized usage to refer to a particular market sector, "the music, and/or video, business" and compound forms such as agribusiness; and the broadest meaning, which encompasses all activity by the community of suppliers of goods and services.

Local printer 111, which is an optional peripheral device which produces a text and/or graphics of documents stored in electronic form, usually on physical print media such as paper or transparencies. Many printers are primarily used as local peripherals, and are attached by a printer cable or, in most newer printers, a USB cable to a computer which serves as a document source. Some local printers, commonly known as network printers, have built-in network interfaces, typically wireless and/or Ethernet based, and can serve as a hard copy device for any user on the network. Individual printers are often designed to support both local and network connected users at the same time. In addition, a few modern printers can directly interface to electronic media such as memory cards, or to image capture devices such as digital cameras, scanners; some printers are combined with a scanners and/or fax machines in a single unit, and can function as photocopiers. Printers that include non-printing features are sometimes called multifunction printers (MFP), multi-function devices (MFD), or all-in-one (AIO) printers. Most MFPs include printing, scanning, and copying among their features.

Consumer and some commercial printers are designed for low-volume, short-turnaround print jobs; requiring virtually no setup time to achieve a hard copy of a given document.

Local printer 111 can be used within the present invention to print coupons. A coupon is defined as: a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great.

Coupons can be used to research the price sensitivity of different groups of buyers (by sending out coupons with different dollar values to different groups). In addition, it is generally assumed that buyers who take the effort to collect and use coupons are more price sensitive than those who do not. Therefore, the posted price paid by price-insensitive buyers can be increased, while using coupon discounts to maintain the price for price-sensitive buyers (who would not buy at a higher price).

Customers may get these coupons from various sources, including national newspapers and the Internet, with web sites offering free printable grocery coupons can be printed at home and use them at retail store. Some major grocery chains also produce digital coupons that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

A mobile coupon is an electronic ticket solicited and/or delivered to a mobile phone that can be exchanged for financial discount or rebate when purchasing product or service.

Customarily coupon are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the mobile coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute mobile coupons.

Private WiFi broadcast 112 is an optional feature of the present invention. WiFi, or Wi-Fi, (pronounced/'waifai/) is a trademark of the Wi-Fi Alliance. A Wi-Fi enable d device such as a personal computer, video game console, smartphone, or digital audio player can connect to the Internet when within range of a wireless network connected to the Internet. The coverage of one or more (interconnected) access points—called hotspots when offering public access—generally comprises an area the size of a few rooms but may be expanded to cover many square miles, depending on the number of access points with overlapping coverage.

A Private Wi-Fi broadcast is one in which a business provides wireless advertising using Wi-Fi technology without consumer 100 needing to be connected to the Internet.

Internet cloud 120, is a global system of interconnected computer networks that use the standard Internet Protocol Suite (TCP/IP) to serve billions of users worldwide. It is a network of networks that consists of millions of private, public, academic, business, and government networks, of local to global scope, that are linked by a broad array of electronic, wireless and optical networking technologies. The Internet carries a vast range of information resources and services, such as the inter-linked hypertext documents of the World Wide Web (WWW) and the infrastructure to support electronic mail.

Web App 130, is an application that is accessed over a network such as the Internet or an intranet. The term may also mean a computer software application that is hosted in a browser-controlled environment (e.g. a Java applet) or coded in a browser-supported language (such as JavaScript, combined with a browser-rendered markup language like HTML) and reliant on a common web browser to render the application executable.

Web apps are popular due to the ubiquity of web browsers, and the convenience of using a web browser as a client, sometimes called a thin client. The ability to update and maintain web applications without distributing and installing software on potentially thousands of client computers is a key reason for their popularity, as is the inherent support for cross-platform compatibility. Common web applications include web-mail, on-line retail sales, on-line auctions, wikis and many other functions. Web App 130 can be used for the primary purpose of allowing artists to upload music, and/or video, and listeners (consumers) to tune into an artists music, and/or videos, or a channel of similarly grouped music, and/or videos, or listeners (consumers) to download music, and/or videos, in addition to optionally providing a copyright registration service for the artists who are uploading their music, and/or videos, as well as the optional issuance of coupons, which can be redeemed, or exchanged for other coupons, and subsequently redeemed.

Web App 130 would provide a system, method, and apparatus for a system to enable musicians (artists) to upload their original works, gain recognition, and earn compensation.

Web App 130 would provide a system, method, and apparatus for a system to create a web-based application that would have social network ability that would enable listeners (consumers) and musicians (artists) to come together Web App 130 would provide a system, method, and apparatus for a system to enable musicians (artists) to upload music, and/or video, files and/or video files.

Web App 130 would provide a system, method, and apparatus for a system to would enable uploaded music, and/or video, to be classified, filtered, sorted, and tagged, and cross geo-tagged, using various genres, including, but not limited to, It is an object of the present invention to provide a system, method, and apparatus that would enable uploaded music, and/or video, that has been finely classified, and tagged, to be geo-tagged to create a database that can be used to identify and categorize persons by their music genre preferences, which can use a wide variety of genres, including, but not limited to, African Genres, Afrobeat, Apala, Benga, Bongo Flava, Bikutsi, Cape Jazz, Chimurenga, Fuji Music, Genge, Highlife, Hiplife, Isicathamiya, Jit, Jùjú, Kapuka, Aka Boomba, Kizomba, Kuduro, Kwaito, Kwela, Makossa, Maloya, Marrabenta, Mbalax, Museve Aka Sungura, Mbaqanga, Mbube, Morna, Palm-Wine, Rai, Reggae, Sakara, Sega, Semba, Soukous AKA Congo or Lingala or African Rumba, Taarab, Zouglou Cote D'ivoire, Asian Genres, Anison, Baila, Bhangra, Bollywood Music, Dangdut, Enka, Kayōkyoku, Luk Thung, Luk Krung, Manila Sound, Morlam, Onkyokei, K-Pop, J-Pop, C-Pop, Taiko, Avant-Garde Genres, Experimental Music, Noise, Lo-Fi, and Musique Concrete; Blues Genres, such as, but not limited to, Acid Blues, African Blues, Blues Rock, Blues Shouter, British Blues, Canadian Blues, Chicago Blues, Classic Female Blues, Contemporary R&B, Country Blues, Delta Blues, Detroit Blues, Electric Blues, Gospel Blues, Hill Country Blues, Hokum Blues, Jazz Blues, Jump Blues, Kansas City Blues, Louisiana Blues, Memphis Blues, Plano Blues, Piedmont Blues, Punk Blues, Rhythm And Blues, Soul Blues, St. Louis Blues, Swamp Blues, Texas Blues, West Coast Blues, Brazilian Music Genres, Samba, Choro, Frevo, Maraca, Bossa Nova, Tropical, Mpb, Font, Samba Rock, Brega, Pagode, Funk Carioca, Axé, Rap, Lambada, Zouk-Lambada, Sertanejo, Brazilian Rock, Tecnobrega, Comedy Music Genres, Comedy Music, Comedy Rock, Parody Music, Country Music Genres, Alternative Country Music, Cowpunk, Blues Country, Hellbilly Music, Hokum, Outlaw Country, Progressive Country, Psychobilly, Punkabilly, Zydeco, Rap Country, Red Dirt, Rockabilly, Rock Country, Cosmic American Music, Soul Country, Techno-Country, Texas Country, Americana, Australian Country Music, and Bakersfield Sound, Bluegrass Music, Old-Time Bluegrass, Appalachian Bluegrass, Progressive Bluegrass, and Reactionary Bluegrass, Cajun, Cajun Fiddle Tunes, Christian Country Music, Classic Country, Close Harmony, Cowboy/Western, Dansband Music, Franco-Country, Gulf And Western, Honky Tonk, Instrumental Country, Lubbock Sound, Nashville Sound/Countrypolitan, Neotraditional Country, New Country, Pop Country/Cosmopolitan Country, Sertanejo, Traditional Country Music, Truck-Driving Country, Western Swing, Easy Listening Genres, Background Music, Beautiful Music, Elevator Music, Furniture Music, Lounge Music, Middle Of The Road, Adult Contemporary, New Age Music, Electronic Music Genres, Ambient, Ambient Dub, Ambient House, Ambient Techno, Dark Ambient, Drone Music, Illbient, Isolationism, Lowercase, Asian Underground, Breakbeat, Acid Breaks, Baltimore Club, Big Beat, Breakbeat Hardcore, Hardcore Breaks, Broken Beat, Florida Breaks, Nu Skool Breaks, 4-Beat, Chiptune, Bitpop, Game Boy Music, Nintendocore, Video Game Music, Yorkshire, Bleeps And Bass, Disco, Cosmic Disco, Disco Polo, Europop, Euro Disco, Space Disco, Italo Disco, Nu-Disco, Downtempo, Acid Jazz, Balearic Beat, Chill Out, Dub Music, Dubtronica, Ethnic Electronica, Moombahton, New Age Music, Nu Jazz, Trip Hop, Drum And Bass, Darkcore, Darkstep, Drumfunk, Drumstep, Hardstep, Intelligent Drum And Bass, Jump-Up, Liquid Funk, Neurofunk, Oldschool Jungle, Darkside Jungle, Ragga-Jungle, Raggacore, Sambass, Trancestep, Electro, Crunk, Electro Backbeat, Electro-Grime, Electropop, Electroacoustic, Acousmatic Music, Computer Music, Electroacoustic Improvisation, Field Recording, Live Electronics, Live Coding, Musique Concrete, Soundscape Composition, Tape Music, Electronica, Berlin School, Chillwave, Electronic Art Music, Electronic Dance Music, Folktronica, Freestyle Music, Idm, Glitch, Laptronica, Rave Breaks, Skweee, Sound Art, Synthcore, Electronic Rock, Alternative Dance, Baggy, Madchester, Dance-Punk, Dance-Rock, Dark Wave, Electroclash, Electropunk, Ethereal Wave, Indietronica, New Rave, Space Rock, Synthpop, Synthpunk, Trip Rock, Eurodance, Bubblegum Dance, Eurotrance, J-Pop, Italo Dance, Turbofolk, Hardcore/Hard, Dance, Bouncy House, Bouncy Techno, Breakcore, Darkcore, Digital Hardcore, Doomcore, Gabber, Happy Hardcore, Hardstyle, Jumpstyle, Makina, Speedcore, Terrorcore, Uk Hardcore, Hi-Nrg, Eurobeat, Hard Nrg, New Beat, House, Acid House, Chicago House, Deep House, Diva House, Dutch House, Electro House, French House, Freestyle House, Funky House, Ghetto House, Hardbag, Hip House, Italo House, Latin House, Minimal House/Microhouse, Progressive House, Rave Music, Swing House, Tech House, Tribal House, UK Hard House, US Garage, Vocal House, Industrial, Aggrotech, Coldwave, Cybergrind, Dark Electro, Death Industrial, Electronic Body Music, Futurepop, Electro-Industrial, Industrial Metal, Neue Deutsche Harte, Industrial Rock, Noise, Japanoise, Power Noise, Power Electronics, Witch House/Drag, Post-Disco, Boogie, Dance-Pop, Progressive, Progressive Breaks, Progressive Drum & Bass, Progressive House/Trance, Disco House, Dream House, Space House, Progressive Techno, Techno, Acid Techno, Detroit Techno, Free Tekno, Ghettotech, Minimal, Nortec, Rotterdam Techno, Schranz/Hardtechno, Symphonic Techno, Tecno Brega, Techno-Dnb, Techstep, Toytown Techno, Trance, Acid Trance, Classic Trance, Dream Trance, Euro-Trance, Goa Trance/Psychedelic Trance, Dark Psytrance, Full On, Psyprog, Psybient, Psybreaks, Suomisaundi, Hard Trance, Tech Trance, Uplifting Trance, Orchestral Uplifting, Vocal Trance, UK Garage, 2-Step, 4.times.4, Bassline, Breakstep, Dubstep, Funky, Grime, Speed Garage, Modern Folk, Contemporary Folk, Indie Folk, Neofolk, Progressive Folk, Anti-Folk, Freak Folk, Filk Music, American Folk, Revival, British Folk Revival, Industrial Folk, Techno-Folk, Psychedelic Folk, Hip Hop, Old School Hip Hop, New School Hip Hop, Golden Age Hip Hop, Alternative Hip Hop, Avant-Garde Hip Hop, Chopped And Screwed, Christian Hip Hop, Conscious Hip Hop, Country-Rap, Crunk, Crunkcore, Electro Music, Freestyle Music, Freestyle Rap, G-Funk, Gangsta Rap, Ghetto House, Ghettotech, Grime, Hardcore Hip Hop, Hip Hop Soul, Hip House, Hip Pop, Horrorcore, Hyphy, Industrial Hip Hop, Instrumental Hip Hop, Jazz Rap, Lyrical Hip Hop, Mafioso Rap, Nerdcore Hip Hop, New Jack Swing, Political Hip Hop, Ragga, Reggaeton, Rap Opera, Rap Rock, Rapcore, Rap Metal, Snap Music, Turntablism, Underground Hip Hop, East Coast Hip Hop, Baltimore Club, Brick City Club, Hardcore Hip Hop, Mafioso Rap, New Jersey Hip Hop, Midwest Hip Hop, Chicago Hip Hop, Ghetto House—From Chicago, Ill., Detroit Hip Hop, Ghettotech, St. Louis Hip Hop, Twin Cities Hip Hop, Horrorcore, Southern Hip Hop, Atlanta Hip Hop, Snap Music, Bounce Music, Crunk, Houston Hip Hop, Chopped And Screwed, Miami Bass, West Coast Hip Hop, Chicano Rap, Gangsta Rap, G-Funk, Hyphy, Jerkin', Bongo Flava, Cumbia Rap, Hiplife, Kwaito, Low Bap, Merenrap, Motswako, Reggae Espanol/Spanish Reggae, Reggaeton, Songo-Salsa, Trip Hop (or Bristol Sound), Urban Pasifika, Jazz, Acid Jazz, Asian American Jazz, Avant-Garde Jazz, Bebop, Boogie-Woogie, Bossa Nova, British Dance Band, Cape Jazz, Chamber Jazz, Continental Jazz, Cool Jazz, Crossover Jazz, Cubop, Dixieland, Ethno Jazz, European Free Jazz, Free Funk, Free Improvisation, Free Jazz, Gypsy Jazz, Hard Bop, Jazz Blues, Jazz-Funk, Jazz Fusion, Jazz Rap, Jazz Rock, Kansas City Blues, Kansas City Jazz, Latin Jazz, Livetronica, M-Base, Mainstream Jazz, Modal Jazz, Neo-Bop Jazz, Neo-Swing, Novelty Ragtime, Nu Jazz, Orchestral Jazz, Post-Bop, Punk Jazz, Ragtime, Shibuya-Kei, Ska Jazz, Smooth Jazz, Soul Jazz, Stride Jazz, Straight-Ahead Jazz, Swing, Third Stream, Trad Jazz, Urban Jazz, Vocal Jazz, West Coast Gypsy Jazz, West Coast Jazz, Zeuhl, Latin American, Axé, Bachata, Baithak Gana, Bossa Nova, Calypso, Chutney, Chutney Soca, Cumbia, Funk Carioca, Huayno, Kompa, Mambo, Mariachi, Merengue, Música Popular Brasileira, Ranchera, Reggaeton, Salsa, Samba, Soca, Son, Tejano, Tropicalismo, Zouk, Pop, Arab Pop, Austropop, Balkan Pop, Baroque Pop, Bubblegum Pop, Classical Crossover, Chinese Pop, Country Pop, Dance-Pop, Disco Polo, Electropop, Eurobeat, Europop, French Pop, Hong Kong And Cantonese Pop, Hong Kong English Pop, Indian Pop, Indonesian Pop, Iranian Pop, Italo Dance, Italo Disco, Jangle Pop, Japanese Pop, Korean Pop, Latin Pop, Levenslied, Louisiana Swamp Pop, Mandarin Pop, Mexican Pop, Motorpop, Nederpop, New Romantic, Operatic Pop, Pop Rap, Psychedelic Pop, Russian Pop, Soft Rock, Sophisti-Pop, Space Age Pop, Sunshine Pop, Surf Pop, Synthpop, Taiwanese Pop, Teen Pop, That Pop, Traditional Pop Music, Turkish Pop, Vispop, Wonky Pop, R&B, Contemporary R&B, Doo Wop, Funk, Deep Funk, Disco, Post-Disco, Boogie, Go-Go, P-Funk, New Jack Swing, Soul, Blue-Eyed Soul, Hip Hop Soul, Northern Soul, Neo Soul, Rock, Alternative Rock, Britpop, Post-Britpop, Dream Pop, Grunge, Post-Grunge, Indie Pop, Dunedin Sound, Twee Pop, Indie Rock, Industrial Rock, Noise Pop, Sadcore, Shoegazer, Slowcore, Art Rock, Beat Music, Chinese Rock, Dark Cabaret, Experimental Rock, Electronic Rock, Folk Rock, Garage Rock, Glam Rock, Hard Rock, Heavy Metal, Alternative Metal, Nu Metal, Black Metal, Viking Metal, Christian Metal, Death Metal, Melodic Death Metal, Technical Death Metal, Goregrind, Doom Metal, Drone Metal, Folk Metal, Celtic Metal, Medieval Metal, Funk Metal, Glam Metal, Gothic Metal, Industrial Metal, Metalcore, Deathcore, Mathcore, Djent, Power Metal, Progressive Metal, Sludge Metal, Speed Metal, Stoner Rock, Symphonic Metal, Thrash Metal, Crossover Thrash Metal, Groove Metal, Jazz-Rock, Math Rock, New Wave, World Fusion, Paisley Underground, Desert Rock, Pop Rock, Post-Metal, Post-Rock, Power Pop, Progressive Rock, Canterbury Scene, Krautrock, New Prog, Rock In Opposition, Space Rock, Psychedelic Rock, Acid Rock, Freakbeat, Neo-Psychedelia, Raga Rock, Punk Rock, Anarcho Punk, Crust Punk, D-Beat, Art Punk, Deathrock, Digital Hardcore, Folk Punk, Celtic Punk, Cowpunk, Gypsy Punk, Garage Punk, Grindcore, Crustgrind, Noisegrind, Hardcore Punk, Post-Hardcore, Emo, Screamo, Thrashcore, Crossover Thrash Metal, Powerviolence, Street Punk, Horror Punk, Pop Punk, Post-Punk, Post-Punk Revival, Psychobilly, Riot Grrrl, Ska Punk, Skacore, Skate Punk, Gothic Rock, No Wave, Noise Rock, Rap Rock, Rap Metal, Rapcore, Rock And Roll, Southern Rock, Sufi Rock, Surf Rock, Visual Kei, Nagoya Kei, Ska, 2 Tone, Dancehall, Dub, Lovers Rock, Ragga, Reggae, Polish Reggae, Reggaefusion, Rocksteady, Contemporary Christian, La*6, Pinoy Pop, Schlager, Sung Poetry, Upscale, and Worldbeat, etc, and videos to be classified, filtered, sorted, and tagged, and cross geo-tagged, using various genres, including, but not limited to, It is an object of the present invention to provide a system, method, and apparatus that would enable uploaded video, that has been finely classified, and tagged, to be geo-tagged to create a database that can be used to identify and categorize persons by their video genre preferences, which can use a wide variety of genres, including, but not limited to, Absolute Film, Action Film, Actuality Film, Adventure Film, Amateur Film, Animated Documentary, Anime, Anthology Film, Apocalyptic And Post-Apocalyptic Fiction, Art Film, Arthouse Action Genre, Backstage Musical, Bad Girl Movies, Beach Party Film, Bildungsroman, Biographical Film, Blaxploitation, Blue Film, Body Horror, Bourekas Film, Buddy Cop Film, Buddy Film, Camcorder Film, Cannibal Film, Cartoon, Chanchada, Chick Flick, Children's Film, Chopsocky, Christian Film Industry, Film Novo, Colonial Film, Comedy Film, Comedy Horror, Comedy Of Remarriage, Comedy-Drama, Comic Fantasy, Comic Science Fiction, Coming-Of-Age Film, Compilation Film, Composite Film, Conspiracy Fiction, Crime Film, Crush Film, Cult Film, Dance Film, Disaster Film, Docudrama, Docufiction, Documentary Film, Drama Film, Educational Film, Epic Film, Epic Western, Erotic Thriller, Ethnofiction, Ethnographic Film, European Art Film, Eurospy Film, Experimental Film, Exploitation Film, Family Film, Fantasy Film, Female Buddy Film, Fictional Film, Film A Clef, Film Gris, Film Noir, Florida Western, Found Footage, Gendai-Geki, German Underground Honor, Giallo, Girls With Guns, Gokud, Goona-Goona Epic, Gross Out, Guerrilla Filmmaking, Guy-Cry Film, Heimatfilm, Heist Film, Heritage Film, Highlight Film, Hip Hop Film, Historical Fiction, Home Movies, Hood Film, Horror Film, Hyperlink Film, Independent Film, Industrial Video, Interstitial Art, Japanese Horror, Jidaigeki, Jukebox Musical, Karl May Film Adaptations, Korean Honor, Korean Melodrama, Legal Drama, Legal Thriller, Lucha Film, Macaroni Combat, Mafia Comedy, Martial Arts Film, Masala, Meat Pie Western, Melodrama, Message Picture, Metafilm, Mexploitation, MicroFilm, Mo Lei Tau, Mob Film, Mockbuster, Mockumentary, Mondo Film, Monster Movie, Monsters Hd, Mountain Film, Mouth Of Garbage Film, Musical Film, Musical Short, Muslim Social, Mystery Film, Mythopoeia, Naturalism, Nazi Exploitation, New Queer Film, Northern, Operetta Film, Ostern, Outlaw Biker Film, Ozploitation, ParaFilm, Parody Film, Period Piece, Pink Film, Poetry Film, Political Thriller, Postmodernist Film, Prison Film, Propaganda Film, Prussian Film, Psycho-Biddy, Psychological Horror, Psychological Thriller, Psychotronic Film, Race Movie, Reality Film, Remodernist Film, Retrospective, Road Movie, Robin Klein/Sandbox/Children's Film Or Family Film, Romance Film, Romantic Comedy Film, Romantic Thriller, Rubble Film, Rumberas Film, Samurai Film, Satire, Sceneggiata, Science Fiction Film, Sscrewball Comedy Film, Semidocumentary, Shinpa, Slapstick Film, Slasher Film, Slow Film, Social Guidance Film, Social Problem Film, South Seas, Space Western, Spaghetti Western, Sponsored Film, Spy Film, Stoner Film, Submarine Film, Superhero Film, Supernatural Drama, Surf Film, Swashbuckler, Swashbuckler Film, Sword-And-Sandal, Telefoni Bianchi, Tendency Film, Thriller, Training Film, Travel Documentary, Trial Film, Underground Film, Vampire Film, War Film, and Weird West.

Web App 130 would provide a system, method, and apparatus for a system to upload a music, and/or video, and/or video file for a fee.

Web App 130 would provide a system, method, and apparatus for a system to charge a service fee for filing a copyright registration.

Web App 130 would provide a system, method, and apparatus for a system to enable listeners (consumers) to vote "like" or "dislike".

Web App 130 would provide a system, method, and apparatus for a system to compensate an artist for uploading, and a listener for listening to music, and/or video, in many ways, such as, but not limited to, coupons, free tickets, movie passes, free downloads, etc, which are issued by the purveyors of the present invention so they may be controlled, and exchanged on a coupon exchange system.

Web App 130 would provide a system, method, and apparatus for a system to provide listeners (consumers) to download a song, or songs, for a fee.

Web App 130 would provide a system, method, and apparatus to compensate an artist for their songs that have been downloaded by listeners (consumers).

Web App 130 would provide a system, method, and apparatus for a system to incent a listener to listen to more songs by allowing them to earn more coupons for goods, services, or a free download, based on the number of songs they have listened to, and/or songs they have downloaded for a fee.

Web App 130 would provide a system, method, and apparatus for a system to enable artists whose music, and/or video, gains a certain audience size to have recording time in a studio for professionally made versions of their music, and/or video.

Web App 130 would provide a system, method, and apparatus for a system to that would provide the purveyors of the present invention the opportunity to act as agents for artists.

Web App 130 would provide a system, method, and apparatus for a system to enable the artist that uploaded music, and/or video, to the web-based application to get notifications via email, text messages, etc, that give them information, such as, but not limited to, number of listens, number of downloads, etc., which can be provided as certified proof to a record label as to how well their music, and/or video, is liked.

Web App 130 would provide a system, method, and apparatus for a system to make the web-based application available on devices, such as, but not limited to, cellphones, PCs, laptops, netbooks, Nooks, Kindles, iPads, etc.

Web App 130 would provide a system, method, and apparatus for a system to This is also unique in the way that the artist tags their work and the listener request that tag for their listening pleasure Web App 130 would be accessible through various social networks, such as, but not limited to, Facebook, Twitter, LinkedIn, etc.

A coupon is defined as: a ticket or document that can be redeemed directly, or exchanged for another coupon that can be redeemed, for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great.

Coupons can be used to research the price sensitivity of different groups of buyers (by sending out coupons with different dollar values to different groups). In addition, it is generally assumed that buyers who take the effort to collect and use coupons are more price sensitive than those who do not. Therefore, the posted price paid by price-insensitive buyers can be increased, while using coupon discounts to maintain the price for price-sensitive buyers (who would not buy at a higher price).

Customers may get these coupons from various sources, including national newspapers and the Internet, with web sites offering free printable grocery coupons can be printed at home and use them at retail store. Some major grocery chains also produce digital coupons that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

A mobile coupon is an electronic ticket solicited and/or delivered to a mobile phone that can be exchanged for financial discount or rebate when purchasing product or service. Customarily coupon are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the mobile coupon at store; some retailers forward the redemption to a clearinghouse for final processing.

Web App 130 can also be programmed to enable end-user, businesses, etc, to exchange coupons within the present invention. This unique feature provides a trading platform and bookkeeping system for its members or clients. Individual members, and member companies can register on Web App 130 to buy, sell, and trade coupons for products and services to each other using an internal currency. The coupon exchange is an effective method for increasing sales, conserving cash, moving inventory, and making use of excess capacity for member companies worldwide. Members, and member companies registered in the coupons change system can earn exchange coupons, and/or credits (instead of cash) that are deposited into their account. Members, and member companies then have the ability to purchase goods and services from other members utilizing their coupons and/or trade credits—and they are not obligated to purchase from who they sold to, and vice-versa. The exchange plays an important role because they provide the record-keeping, brokering expertise and monthly statements to each member. The exchange can make money through Internet advertising, or by charging a commission on each transaction either all on the buy side, all on the sell side, or a combination of both. Fees may be collected per transaction, or at a flat recurring rate, or a combination of both.

The coupon exchange can also act as a global, worldwide decentralized market arbiter for exchanging coupons. The coupon exchange can act as an anchor of trading between a wide range of different types of members, and member companies buying, selling, and/or trading coupons whose intrinsic value is tied to the country, or countries a particular coupon is redeemable in vs. the underlying relative value of different currencies.

The coupon exchange can also act as a central exchange where members and member companies people can trade standardized futures contracts, which is a contract to buy specific quantities of coupons, or exchange credits at a specified price with the delivery set at a specified time in the future. This instrument may be priced according to the movement of the underlying asset, which may be a coupon, or exchange credit.

Web App 130 runs on at least one database (not shown) on at least one server (not shown). The database(s) are used to store information related to members, and member businesses. The demographic information stored on the present invention's database(s) can be used to drive a messaging system.

The present invention's database(s) are accessible via the Internet cloud 120. The present invention's database server(s) can be a collection of one or more servers, computers, etc. that are able to provide functionality for the present invention. The present invention's servers can include multiple similar and distinct hardware components or models, such as but not limited to Dell, IBM, Sun, HP and required operating system software such as but not limited to UNIX, Microsoft Windows, Redhat Linux and other required supportive operating systems. In addition, servers can include a multitude of supporting software components required to support the implementation of the present invention including, but not limited to Apache Web Server software, Microsoft IIS Web Server Software, Oracle, MySQL, Lightweight Directory Access Protocol (LDAP), Domain Name System (DNS) and HyperText Transfer Protocol (HTTP), Voice recognition software, Voice application engines, Application engines, and CORBA software and middle-ware The present invention's database(s)' represents the storage of data including software required to run servers and provide functionality for the present invention. the present invention's database(s) can be attached to server via network transport or bus connections including, but not limited to Small Computer Systems Interface (SCSI), Internet SCSI (iSCSI), Peripheral Component Interconnect (PCI), Fiber optic transport, Fiber Channel, TCP/IP, and SNA. In addition, the present invention's database(s) can be a collection of one or more media storage units that are located locally or remotely to servers. the present invention's database(s) can be built on storage such as, but not limited to, magnetic and optical media. These systems and associated software may be housed in an Internet Data Center equipped with fully redundant subsystems, such as multiple fiber trunks coming from multiple sources, redundant power supplies, and backup power generators. the present invention's database(s) may also utilize firewall technology to securely protect the information stored in the present invention's database(s). In addition, the present invention's database(s) may provide secure access through the use of passwords, Personal Identification Numbers (PIN), and/or biometric identification. A member, or business member may be connected to the present invention's database(s) via access networks. Access networks (not shown) may be configured as Cable TV, PSTN, etc. and can be used for accessing information stored in the present invention's database(s), and for messaging members, or business members connected via an access network to the Internet cloud. one of these types of networks. A member, or business member may use a wide variety of devices to access the present invention's database(s), such as, but not limited to, intelligent building interfaces, PCs, TVs, set-tops boxes, Internet appliances, e-mail stations, telephones, cellphones, tablets, laptops, etc. The aforementioned devices (not shown) are usually connected to an access network via a router (not shown), or switch (not shown).

At a minimum, access networks are typically configured with a multiplexer (not shown) and line interface device (not shown). The line interface device may be configured as a stand-alone modem, a PCMCIA card, as a wireless POP, or integrated into various devices, including, but not limited to PCs, cellphones, set-top boxes, tablets, laptops, etc.

The multiplexer may be located at the Central Office, or Digital Loop Carrier of a telephony network, or the Head-End, or intermediate node of a Cable TV network, or at a third-party Application Server Provider's office, or the network center of an auction house, etc. The multiplexer is capable of receiving analog and digital signals including, but not limited to, Internet cloud 120 traffic including e-mail from e-mail servers (not shown) and data from servers, and voice feed from the PSTN, etc. The multiplexed signal may be transmitted over a variety of transmission medium, including but not limited to, coaxial cable, fiber optic cable, twisted pair, plastic fiber cable, airwaves, or a combination of these.

The present invention's databases can be accessed by a specific member, or business member through the Internet cloud 120 to add, modify, and delete data related to their coupon exchange account.

Remote print shop 140 is an optional component of the present invention. Remote print shop 140 is a company or individual that provide printing services, which may operate printers and/or printing presses.

Local printer 141, which is an optional peripheral device which produces a text and/or graphics of documents stored in electronic form, usually on physical print media such as paper or transparencies. Many printers are primarily used as local peripherals, and are attached by a printer cable or, in most newer printers, a USB cable to a computer which serves as a document source. Some local printers, commonly known as network printers, have built-in network interfaces, typically wireless and/or Ethernet based, and can serve as a hard copy device for any user on the network. Individual printers are often designed to support both local and network connected users at the same time. In addition, a few modern printers can directly interface to electronic media such as memory cards, or to image capture devices such as digital cameras, scanners; some printers are combined with a scanners and/or fax machines in a single unit, and can function as photocopiers. Printers that include non-printing features are sometimes called multifunction printers (MFP), multi-function devices (MFD), or all-in-one (AIO) printers. Most MFPs include printing, scanning, and copying among their features.

Consumer and some commercial printers are designed for low-volume, short-turnaround print jobs; requiring virtually no setup time to achieve a hard copy of a given document.

Also, local printer 141 could be a printing press which is a device for applying pressure to an inked surface resting upon a print medium.

Local printer 141 can be used within the present invention to print coupons. A coupon is defined as: a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile devices such as cell phones. Since only price conscious consumers are likely to spend the time to claim the savings, coupons function as a form of price discrimination, enabling retailers to offer a lower price only to those consumers who would otherwise go elsewhere. In addition, coupons can also be targeted selectively to regional markets in which price competition is great.

Coupons can be used to research the price sensitivity of different groups of buyers (by sending out coupons with different dollar values to different groups). In addition, it is generally assumed that buyers who take the effort to collect and use coupons are more price sensitive than those who do not. Therefore, the posted price paid by price-insensitive buyers can be increased, while using coupon discounts to maintain the price for price-sensitive buyers (who would not buy at a higher price).

Customers may get these coupons from various sources, including national newspapers and the Internet, with web sites offering free printable grocery coupons can be printed at home and use them at retail store. Some major grocery chains also produce digital coupons that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

A mobile coupon is an electronic ticket solicited and/or delivered to a mobile phone that can be exchanged for financial discount or rebate when purchasing product or service. Customarily coupon are issued by manufacturers of consumer packaged goods or retailers, to be used in retail stores as part of a sales promotion. They are often distributed through WAP Push over SMS or MMS, or other mobile means. The customer redeems the coupon at store or online. In some cases customer redeems the mobile coupon at store; some retailers forward the redemption to a clearinghouse for final processing. A mobile device, such as, but not limited to a cellphone, smartphone, tablet, laptop, netbook, PC, etc., can be used within the present invention to handle, manage, store, sort, concatenate, collate, and distribute mobile coupons.

Communication links 170A, B, C, D. These communication links can be hard-wired and/or wireless technologies. Communication links 170A, B, C, D, are the means of connecting one location to another for the purpose of transmitting and receiving analog or digital information. There are at least three types of basic data-link configurations that can be conceived of and used:

Simplex communications, most commonly meaning all communications in one direction only.

Half-duplex communications, meaning communications in both directions, but not both ways simultaneously.

Duplex communications, communications in both directions simultaneously.

Free delivery 160 is from a business 110 to consumer 100. This free delivery can take the form of a FedEx, USPS, UPS, laundry delivery, flower delivery, pizza delivery person and their vehicle delivering their normal goods in addition to hard-copy advertising and marketing materials generated for, and related to a specific customer.

Free delivery 161, which is an optional component of the present invention, is from a consumer 100 to a business 110. This free delivery can take the form of a consumer 100 driving their own car to a business 110, taking a bus or cab to a business 110, riding their bike to business 110, walking to a business 110, etc.

Communication links 190A, B, C These communication links can be hard-wired and/or wireless technologies. Communication links 190A, B, C are the means of connecting one location to another for the purpose of transmitting and receiving analog or digital information. As an example, these communication links can be used by the consumer using their cell phone to scan a bar code on a hard copy advertisement that has been delivered for free, in order to link back up to the Internet. There are at least three types of basic data-link configurations that can be conceived of and used:

Simplex communications, most commonly meaning all communications in one direction only.

Half-duplex communications, meaning communications in both directions, but not both ways simultaneously.

Duplex communications, communications in both directions simultaneously.

Having thus described a preferred embodiment and other embodiments of a system, method, and apparatus for many different applications for real world marketing and advertising methods that are agile, can employ virtually any marketing and advertising method, uses on-demand printing, and existing methods of free delivery of real world objects as a means of free delivery of advertising and marketing materials to a consumer, and it should be apparent to those skilled in the art that certain advantages of the present invention have been achieved. It should also be appreciated that various modifications, adaptations, and alternatives may be made. It is of course not possible to describe every conceivable combination of components for purposes of describing the present invention. All such possible modifications are to be included within the spirit and scope of the present invention which is to be limited only by the following claims.

What is claimed is:

1. A system for evaluating media files and selectively making available the media files from a remote server, the system comprising:
    software instructions associated with a software application, the software application for distribution to a plurality of computing devices for making available the media files to users of the computing devices;
    the software instructions associated with the software application making available a user interface for accessing a set of media files stored on a computer readable medium at the remote sever, the user interface configured to present the set of media files to a plurality of users, wherein the user interface allows for each of the media files to be displayed and/or played and wherein the user interface further allows for each of the media file to be voted on with a like or a dislike and wherein the user interface provides for receiving one or more of the media files from a computing device of a first user, receiving one or more requests from at least one second user via a computing device of the second user for the one or more of the media files to be forwarded to a computing device of a third user of the application and forwarding the one or more of the media files from the remote server to the computing device of the third user of the application in response to the one or more requests;
    software instructions associated with a computer readable medium of the remote server which upon execution by one or more processors of the remote server cause the remote server to:
    determine by the remote server one or more of the set of media files is uploaded to the remote server by the computing device of the first user;
    store the one or more of the set of media files uploaded on a memory of the remote server;
    assign a number of flushes to each of the media files at the remote server;
    make available the one or more media files uploaded through the user interface for public consumption over an internet computer network wherein the media file corresponds to a specific identifier of the first user;
    receive at the remote server from multiple users using the plurality of computing devices votes for or against the media files through the user interface and tracking forwards through the user interface from the multiple users at the server;
    maintain by the remote server a count of the number of flushes for each of the media files in the memory of the remote server by reducing the number of flushes for each vote against each of the media files and increasing the count of the number of flushes for each occurrence of forwarding the media file to another user;
    provide a notification to the first user from the remote server, the notification comprising information about the one or more media files received from the first user, wherein the information comprises a number of times the one or more media files is forwarded, wherein the notification is communicated to the computing device of the first user; and
    remove from the set of media files from the memory by the remote server, media files once the count of the number of flushes reduces to zero such that the media files are not made available by the remote server through the user interface of the application to be voted on or forwarded.

2. The system of claim 1 wherein each of the media files comprises a song.

3. The system of claim 1 wherein each of the media files is a video file.

4. The system of claim 1 wherein the software application is a web application.

5. The system of claim 1 wherein the software instructions associated with the computer readable medium of the remote server further provide for assigning a genre tag to each of the media files.

6. The system of claim 1 wherein the count of the number of flushes is increased by two for each occurrence of forwarding the media file to another user.

7. The system of claim 6 wherein the count of the number of flushes is decreased by one for each of the votes against the media file.

8. The system of claim 1 wherein the user interface further provides for a user to pass on an opportunity to vote on one of the media files.

9. The system of claim 8 wherein the number of flushes is not affected for each pass for the media file.

10. The system of claim 1 wherein the software application is accessible through a social network.

11. The system of claim 1 wherein the software instructions associated with the software application further provide for distributing a coupon through the software application to the computing device of the first user after the first user has uploaded the one or more media files wherein the coupon is a mobile coupon.

12. The system of claim 2 wherein the software instructions associated with the software application are further configured to
    play the one or more media files by the second user at the computing device of the second user; and
    deliver delivering a coupon through the software application to the second user after the second user plays to the one or more media files wherein the coupon is delivered to the computing device of the second user and wherein the coupon has a unique identifier.

13. The system of claim 11 wherein the software application includes instructions configured to:
    geographically tag the location of the one or more of the media files uploaded;
    distribute a coupon through the software application to the computing device of the first user; and
    target the coupon to the location of the one or more of the media files uploaded.

14. The system of claim 1 wherein the software application includes instructions configured to:
    distribute a coupon through the software application to at least one user of the users of the computing device;
    access through the user interface of the software application a coupon exchange; and
    exchange the coupon at the coupon exchange for a second coupon.

* * * * *